(12) United States Patent
Wang et al.

(10) Patent No.: US 7,607,076 B2
(45) Date of Patent: Oct. 20, 2009

(54) EMBEDDED INTERACTION CODE DOCUMENT

(75) Inventors: Jian Wang, Beijing (CN); Liyong Chen, Beijing (CN); Youjun Liu, Beijing (CN); Jiang Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 420 days.

(21) Appl. No.: 11/062,166

(22) Filed: Feb. 18, 2005

(65) Prior Publication Data

US 2006/0190818 A1   Aug. 24, 2006

(51) Int. Cl.
*G06F 17/00* (2006.01)
(52) U.S. Cl. .......... 715/200; 715/251; 382/306; 382/314; 382/321; 707/E17.008
(58) Field of Classification Search ......... 715/500, 715/505–508, 512, 513, 753, 200, 221–224, 715/230, 234, 251, 537; 382/291, 321, 306, 382/314; 345/173, 179; 178/18.09; 707/E17.008
See application file for complete search history.

(56) References Cited

U.S. PATENT DOCUMENTS

| 4,686,329 A | 8/1987 | Joyce |
| 4,742,558 A | 5/1988 | Ishibashi et al. |
| 4,745,269 A | 5/1988 | Van Gils et al. |
| 4,829,583 A | 5/1989 | Monroe et al. |
| 4,941,124 A | 7/1990 | Skinner, Jr. |
| 5,032,924 A | 7/1991 | Brown et al. |
| 5,051,736 A | 9/1991 | Bennett et al. |
| 5,073,966 A | 12/1991 | Sato et al. |
| 5,146,552 A | 9/1992 | Cassorla et al. |
| 5,153,928 A * | 10/1992 | Iizuka ................ 382/321 |
| 5,181,257 A | 1/1993 | Steiner et al. |
| 5,196,875 A | 3/1993 | Stuckler |
| 5,235,654 A * | 8/1993 | Anderson et al. ........ 382/180 |
| 5,243,149 A * | 9/1993 | Comerford et al. ...... 178/18.03 |
| 5,247,137 A | 9/1993 | Epperson |
| 5,253,336 A | 10/1993 | Yamada |
| 5,288,986 A | 2/1994 | Pine et al. |
| 5,294,792 A | 3/1994 | Lewis et al. |

(Continued)

FOREIGN PATENT DOCUMENTS

CN          1303494          7/2001

(Continued)

OTHER PUBLICATIONS

U.S. Appl. No. 10/849,249, Wang.

(Continued)

*Primary Examiner*—Doug Hutton
*Assistant Examiner*—James H Blackwell
(74) *Attorney, Agent, or Firm*—Perkins Coie LLP

(57) ABSTRACT

Methods and apparatuses that synchronize a paper document to an associated digital document by establishing a mapping. An embedded interactive code (EIC) Document is created as a digital file that serves as an intermediate tier between the paper document and the digital document. Both the paper document and the EIC document are generated while printing the paper document. The EIC document records the corresponding EIC array allocations and a unique document identification number. An image capturing pen may generate a stroke on any page of paper document. With the EIC document, the methods and apparatuses inform an application the page and location on the page of the stroke.

19 Claims, 17 Drawing Sheets

U.S. PATENT DOCUMENTS

| | | | |
|---|---|---|---|
| 5,335,150 A | 8/1994 | Huang | |
| 5,365,598 A | 11/1994 | Sklarew | |
| 5,394,487 A * | 2/1995 | Burger et al. | 382/209 |
| 5,398,082 A | 3/1995 | Henderson et al. | |
| 5,414,227 A | 5/1995 | Schubert et al. | |
| 5,442,147 A | 8/1995 | Burns et al. | |
| 5,448,372 A | 9/1995 | Axman et al. | |
| 5,450,603 A | 9/1995 | Davies | |
| 5,454,054 A | 9/1995 | Iizuka | |
| 5,471,533 A | 11/1995 | Wang et al. | |
| 5,477,012 A * | 12/1995 | Sekendur | 178/18.09 |
| 5,511,156 A | 4/1996 | Nagasaka | |
| 5,546,515 A | 8/1996 | Mochizuki et al. | |
| 5,581,637 A | 12/1996 | Cass et al. | |
| 5,581,682 A | 12/1996 | Anderson et al. | |
| 5,587,558 A | 12/1996 | Matsushima et al. | |
| 5,612,524 A | 3/1997 | Sant'Anselmo et al. | |
| 5,626,620 A | 5/1997 | Kieval et al. | |
| 5,629,499 A * | 5/1997 | Flickinger et al. | 178/18.01 |
| 5,635,697 A | 6/1997 | Shellhammer et al. | |
| 5,644,652 A | 7/1997 | Bellegarda et al. | |
| 5,652,412 A * | 7/1997 | Lazzouni et al. | 178/18.01 |
| 5,661,291 A | 8/1997 | Ahearn et al. | |
| 5,661,506 A * | 8/1997 | Lazzouni et al. | 345/179 |
| 5,670,897 A | 9/1997 | Kean | |
| 5,686,718 A | 11/1997 | Iwai et al. | |
| 5,692,073 A * | 11/1997 | Cass | 382/219 |
| 5,719,884 A | 2/1998 | Roth et al. | |
| 5,721,940 A * | 2/1998 | Luther et al. | 715/200 |
| 5,726,435 A | 3/1998 | Hara et al. | |
| 5,727,098 A | 3/1998 | Jacobson | |
| 5,754,280 A | 5/1998 | Kato et al. | |
| 5,756,981 A | 5/1998 | Roustaei et al. | |
| 5,765,176 A | 6/1998 | Bloomberg | |
| 5,774,602 A | 6/1998 | Taguchi et al. | |
| 5,817,992 A | 10/1998 | D'Antonio | |
| 5,818,436 A | 10/1998 | Imai et al. | |
| 5,822,436 A | 10/1998 | Rhoads | |
| 5,822,465 A | 10/1998 | Normile et al. | |
| 5,825,015 A | 10/1998 | Chan et al. | |
| 5,825,892 A | 10/1998 | Braudaway et al. | |
| 5,850,058 A | 12/1998 | Tano et al. | |
| 5,852,434 A * | 12/1998 | Sekendur | 345/179 |
| 5,855,483 A | 1/1999 | Collins et al. | |
| 5,855,594 A | 1/1999 | Olive et al. | |
| 5,875,264 A | 2/1999 | Carlstrom | |
| 5,890,177 A * | 3/1999 | Moody et al. | 715/210 |
| 5,897,648 A * | 4/1999 | Henderson | 715/210 |
| 5,898,166 A | 4/1999 | Fukuda et al. | |
| 5,902,968 A | 5/1999 | Sato et al. | |
| 5,937,110 A | 8/1999 | Petrie et al. | |
| 5,939,703 A * | 8/1999 | Hecht et al. | 235/494 |
| 5,960,124 A | 9/1999 | Taguchi et al. | |
| 5,961,571 A | 10/1999 | Gorr et al. | |
| 5,995,084 A | 11/1999 | Chan et al. | |
| 6,000,614 A | 12/1999 | Yang et al. | |
| 6,000,621 A | 12/1999 | Hecht et al. | |
| 6,000,946 A * | 12/1999 | Snyders et al. | 434/365 |
| 6,005,973 A | 12/1999 | Seybold et al. | |
| 6,041,335 A * | 3/2000 | Merritt et al. | 715/203 |
| 6,044,165 A | 3/2000 | Perona et al. | |
| 6,044,301 A | 3/2000 | Hartlaub et al. | |
| 6,052,481 A | 4/2000 | Grajski et al. | |
| 6,054,990 A | 4/2000 | Tran | |
| 6,076,734 A | 6/2000 | Dougherty et al. | |
| 6,081,261 A | 6/2000 | Wolff et al. | |
| 6,108,453 A | 8/2000 | Acharya | |
| 6,141,014 A | 10/2000 | Endo et al. | |
| 6,151,424 A | 11/2000 | Hsu | |
| 6,157,935 A | 12/2000 | Tran et al. | |
| 6,181,329 B1 | 1/2001 | Stork et al. | |
| 6,186,405 B1 * | 2/2001 | Yoshioka | 235/494 |
| 6,188,392 B1 | 2/2001 | O'Connor et al. | |
| 6,192,380 B1 * | 2/2001 | Light et al. | 715/207 |
| 6,202,060 B1 | 3/2001 | Tran | |
| 6,208,771 B1 | 3/2001 | Jared et al. | |
| 6,208,894 B1 | 3/2001 | Schulman et al. | |
| 6,219,149 B1 | 4/2001 | Kawata et al. | |
| 6,226,636 B1 | 5/2001 | Abdel-Mottaleb et al. | |
| 6,230,304 B1 | 5/2001 | Groeneveld et al. | |
| 6,243,071 B1 | 6/2001 | Shwarts et al. | |
| 6,249,614 B1 | 6/2001 | Kolesnik et al. | |
| 6,254,253 B1 | 7/2001 | Daum et al. | |
| 6,256,398 B1 | 7/2001 | Chang | |
| 6,259,827 B1 | 7/2001 | Nichani | |
| 6,278,968 B1 | 8/2001 | Franz et al. | |
| 6,294,775 B1 | 9/2001 | Seibel et al. | |
| 6,310,988 B1 | 10/2001 | Flores et al. | |
| 6,327,395 B1 | 12/2001 | Hecht et al. | |
| 6,330,976 B1 * | 12/2001 | Dymetman et al. | 235/487 |
| 6,335,727 B1 | 1/2002 | Morishita et al. | |
| 6,340,119 B2 | 1/2002 | He et al. | |
| 6,396,598 B1 | 5/2002 | Kashiwagi et al. | |
| 6,408,330 B1 | 6/2002 | DeLaHuerga | |
| 6,441,920 B1 | 8/2002 | Smith | |
| 6,479,768 B1 | 11/2002 | How | |
| 6,492,981 B1 | 12/2002 | Stork et al. | |
| 6,517,266 B2 * | 2/2003 | Saund | 400/88 |
| 6,522,928 B2 | 2/2003 | Whitehurst et al. | |
| 6,529,638 B1 | 3/2003 | Westerman | |
| 6,532,152 B1 | 3/2003 | White et al. | |
| 6,538,187 B2 | 3/2003 | Beigi | |
| 6,546,136 B1 | 4/2003 | Hull | |
| 6,551,357 B1 | 4/2003 | Madduri | |
| 6,560,741 B1 | 5/2003 | Gerety et al. | |
| 6,570,104 B1 * | 5/2003 | Ericson et al. | 178/18.09 |
| 6,570,997 B2 | 5/2003 | Noguchi | |
| 6,573,887 B1 | 6/2003 | O'Donnell, Jr. | |
| 6,577,299 B1 | 6/2003 | Schiller et al. | |
| 6,580,424 B1 | 6/2003 | Krumm | |
| 6,584,052 B1 | 6/2003 | Phillips et al. | |
| 6,585,154 B1 | 7/2003 | Ostrover et al. | |
| 6,592,039 B1 | 7/2003 | Smith et al. | |
| 6,603,464 B1 | 8/2003 | Rabin | |
| 6,625,313 B1 * | 9/2003 | Morita et al. | 382/181 |
| 6,628,267 B2 | 9/2003 | Karidis et al. | |
| 6,650,320 B1 | 11/2003 | Zimmerman | |
| 6,655,597 B1 | 12/2003 | Swartz et al. | |
| 6,661,920 B1 * | 12/2003 | Skinner | 382/187 |
| 6,663,008 B1 * | 12/2003 | Pettersson et al. | 235/494 |
| 6,671,386 B1 | 12/2003 | Shimizu et al. | |
| 6,674,427 B1 * | 1/2004 | Pettersson et al. | 345/179 |
| 6,681,045 B1 | 1/2004 | Lapstun et al. | |
| 6,686,910 B2 | 2/2004 | O'Donnell, Jr. | |
| 6,689,966 B2 * | 2/2004 | Wiebe | 178/18.01 |
| 6,693,615 B2 | 2/2004 | Hill et al. | |
| 6,697,056 B1 * | 2/2004 | Bergelson et al. | 345/178 |
| 6,728,000 B1 * | 4/2004 | Lapstun et al. | 358/1.15 |
| 6,729,543 B1 * | 5/2004 | Arons et al. | 235/462.13 |
| 6,731,271 B1 | 5/2004 | Tanaka et al. | |
| 6,732,927 B2 | 5/2004 | Olsson et al. | |
| 6,738,053 B1 * | 5/2004 | Borgstrom et al. | 345/179 |
| 6,744,967 B2 | 6/2004 | Kaminski et al. | |
| 6,752,317 B2 | 6/2004 | Dymetman et al. | |
| 6,760,009 B2 | 7/2004 | Omura et al. | |
| 6,783,069 B1 * | 8/2004 | Hecht et al. | 235/454 |
| 6,819,776 B2 | 11/2004 | Chang | |
| 6,831,273 B2 | 12/2004 | Jenkins et al. | |
| 6,832,724 B2 | 12/2004 | Yavid et al. | |
| 6,834,081 B2 | 12/2004 | Kim et al. | |
| 6,834,195 B2 | 12/2004 | Brandenberg et al. | |
| 6,834,337 B1 | 12/2004 | Mitchell et al. | |
| 6,847,356 B1 | 1/2005 | Hasegawa et al. | |
| 6,856,712 B2 | 2/2005 | Fauver et al. | |

| | | | | | | |
|---|---|---|---|---|---|---|
| 6,862,371 | B2 | 3/2005 | Mukherjee | 2003/0081000 A1 | 5/2003 | Watanabe et al. |
| 6,864,880 | B2 | 3/2005 | Hugosson et al. | 2003/0088781 A1 | 5/2003 | ShamRao |
| 6,865,325 | B2 | 3/2005 | Ide et al. | 2003/0090475 A1 | 5/2003 | Paul et al. |
| 6,870,966 | B1 | 3/2005 | Silverbrook et al. | 2003/0117378 A1 | 6/2003 | Carro |
| 6,879,731 | B2 | 4/2005 | Kang et al. | 2003/0128194 A1 | 7/2003 | Pettersson |
| 6,880,124 | B1 * | 4/2005 | Moore ................ 715/210 | 2003/0146883 A1 | 8/2003 | Zelitt |
| 6,897,854 | B2 | 5/2005 | Cho et al. | 2003/0159044 A1 | 8/2003 | Doyle et al. |
| 6,898,297 | B2 | 5/2005 | Katsura et al. | 2003/0179906 A1 | 9/2003 | Baker et al. |
| 6,929,183 | B2 | 8/2005 | Pettersson et al. | 2003/0189731 A1 | 10/2003 | Chang |
| 6,933,933 | B2 | 8/2005 | Fleming | 2003/0214553 A1 | 11/2003 | Dodge |
| 6,938,222 | B2 | 8/2005 | Hullender et al. | 2003/0214669 A1 | 11/2003 | Saitoh |
| 6,956,968 | B1 | 10/2005 | O'Dell et al. | 2004/0032393 A1 | 2/2004 | Brandenberg et al. |
| 6,960,777 | B2 | 11/2005 | Soar | 2004/0046744 A1 | 3/2004 | Rafii et al. |
| 6,964,483 | B2 | 11/2005 | Wang et al. | 2004/0085302 A1 | 5/2004 | Wang et al. |
| 6,968,083 | B2 | 11/2005 | Williams et al. | 2004/0086181 A1 | 5/2004 | Wang et al. |
| 6,975,334 | B1 | 12/2005 | Barrus | 2004/0090429 A1 | 5/2004 | Geaghan et al. |
| 6,976,220 | B1 * | 12/2005 | Lapstun et al. ............ 715/753 | 2004/0128264 A1 * | 7/2004 | Leung et al. ................ 705/402 |
| 6,992,655 | B2 | 1/2006 | Ericson et al. | 2004/0153649 A1 | 8/2004 | Rhoads et al. |
| 6,999,622 | B2 | 2/2006 | Komatsu | 2004/0212553 A1 | 10/2004 | Wang et al. |
| 7,003,150 | B2 | 2/2006 | Trajkovi | 2004/0233163 A1 | 11/2004 | Lapstun et al. |
| 7,009,594 | B2 | 3/2006 | Wang et al. | 2005/0024324 A1 | 2/2005 | Tomasi et al. |
| 7,012,621 | B2 | 3/2006 | Crosby et al. | 2005/0044164 A1 | 2/2005 | O'Farrell et al. |
| 7,024,429 | B2 | 4/2006 | Ngo et al. | 2005/0052700 A1 * | 3/2005 | Mackenzie et al. ......... 358/1.18 |
| 7,036,938 | B2 | 5/2006 | Wang et al. | 2005/0104909 A1 | 5/2005 | Okamura et al. |
| 7,048,198 | B2 | 5/2006 | Ladas et al. | 2005/0106365 A1 | 5/2005 | Palmer et al. |
| 7,092,122 | B2 | 8/2006 | Iwaki et al. | 2005/0146518 A1 | 7/2005 | Wang et al. |
| 7,110,604 | B2 | 9/2006 | Olsson et al. | 2005/0147281 A1 | 7/2005 | Wang et al. |
| 7,111,230 | B2 | 9/2006 | Euchner et al. | 2005/0193292 A1 | 9/2005 | Lin et al. |
| 7,116,840 | B2 * | 10/2006 | Wang et al. ................ 382/291 | 2006/0109263 A1 | 5/2006 | Wang et al. |
| 7,119,816 | B2 | 10/2006 | Zhang et al. | 2006/0123049 A1 | 6/2006 | Wang et al. |
| 7,133,031 | B2 | 11/2006 | Wang et al. | 2006/0182309 A1 | 8/2006 | Wang et al. |
| 7,133,563 | B2 | 11/2006 | Wang et al. | 2006/0182343 A1 | 8/2006 | Lin et al. |
| 7,136,054 | B2 | 11/2006 | Wang et al. | 2006/0204101 A1 | 9/2006 | Wang et al. |
| 7,139,740 | B2 | 11/2006 | Ayala | 2006/0242560 A1 | 10/2006 | Wang et al. |
| 7,142,197 | B2 | 11/2006 | Wang et al. | 2006/0242562 A1 | 10/2006 | Wang et al. |
| 7,142,257 | B2 | 11/2006 | Callison et al. | 2006/0242622 A1 | 10/2006 | Wang et al. |
| 7,145,556 | B2 | 12/2006 | Pettersson | 2006/0274948 A1 | 12/2006 | Wang et al. |
| 7,167,164 | B2 | 1/2007 | Ericson et al. | 2007/0001950 A1 | 1/2007 | Zhang et al. |
| 7,176,906 | B2 | 2/2007 | Williams et al. | 2007/0003150 A1 | 1/2007 | Xu et al. |
| 7,190,843 | B2 | 3/2007 | Wei et al. | 2007/0041654 A1 | 2/2007 | Wang et al. |
| 7,222,799 | B2 | 5/2007 | Silverbrook | 2007/0042165 A1 | 2/2007 | Wang et al. |
| 7,225,979 | B2 | 6/2007 | Silverbrook et al. | 2008/0025612 A1 | 1/2008 | Wang et al. |
| 7,262,764 | B2 | 8/2007 | Wang et al. | 2009/0067743 A1 | 3/2009 | Wang et al. |
| 7,263,224 | B2 | 8/2007 | Wang et al. | | | |
| 7,289,103 | B2 | 10/2007 | Lapstun et al. | | | |
| 7,292,370 | B2 | 11/2007 | Iwaki et al. | | | |

FOREIGN PATENT DOCUMENTS

| | | |
|---|---|---|
| 7,293,240 B2 | 11/2007 Lapstun et al. | |
| 7,295,193 B2 | 11/2007 Fahraeus | |
| 7,330,605 B2 | 2/2008 Wang et al. | CN 1352778 6/2002 |
| 7,386,191 B2 | 6/2008 Wang et al. | EP 0407734 1/1991 |
| 7,400,777 B2 | 7/2008 Wang et al. | EP 0439682 8/1991 |
| 7,403,658 B2 | 7/2008 Lin et al. | EP 0564708 10/1993 |
| 7,421,439 B2 | 9/2008 Wang et al. | EP 0670555 9/1995 |
| 7,430,497 B2 | 9/2008 Wang et al. | EP 0694870 1/1996 |
| 7,440,134 B2 | 10/2008 Natori | EP 0717368 6/1996 |
| 7,463,784 B2 | 12/2008 Kugo | EP 0732666 9/1996 |
| 7,486,822 B2 | 2/2009 Wang et al. | EP 0865166 9/1998 |
| 7,486,823 B2 | 2/2009 Wang et al. | EP 1154377 11/2001 |
| 7,502,508 B2 | 3/2009 Wang et al. | EP 1158456 11/2001 |
| 2001/0038383 A1 | 11/2001 Ericson et al. | EP 1168231 1/2002 |
| 2001/0053238 A1 | 12/2001 Katsura et al. | EP 1276073 1/2003 |
| 2002/0028018 A1 * | 3/2002 Hawkins et al. ............ 382/187 | EP 1416435 5/2004 |
| 2002/0031622 A1 | 3/2002 Ippel et al. | GB 2393149 3/2004 |
| 2002/0048404 A1 | 4/2002 Fahraeus et al. | JP 63165584 7/1988 |
| 2002/0050982 A1 * | 5/2002 Ericson ................ 345/173 | JP 04253087 9/1992 |
| 2002/0069220 A1 | 6/2002 Tran | JP 06006316 1/1994 |
| 2002/0163511 A1 | 11/2002 Sekendur | JP 06209482 7/1994 |
| 2002/0179717 A1 | 12/2002 Cummings et al. | JP 06230886 8/1994 |
| 2003/0001020 A1 | 1/2003 Kardach | JP 07020812 1/1995 |
| 2003/0009725 A1 | 1/2003 Reichenbach | JP 07225564 8/1995 |
| 2003/0030638 A1 | 2/2003 Astrom et al. | JP 10215450 8/1998 |
| 2003/0034961 A1 | 2/2003 Kao | JP 11308112 11/1999 |
| 2003/0050803 A1 | 3/2003 Marchosky | JP 2000131640 5/2000 |
| | | JP 2002529796 9/2000 |
| | | JP 2002082763 3/2002 |

| | | |
|---|---|---|
| JP | 2002108551 | 4/2002 |
| WO | WO-9630217 | 10/1996 |
| WO | WO-9960469 | 11/1999 |
| WO | WO-9965568 | 12/1999 |
| WO | WO-0025293 | 5/2000 |
| WO | WO-0072247 | 11/2000 |
| WO | WO-0073983 | 12/2000 |
| WO | WO-0126032 | 4/2001 |
| WO | WO-0148685 | 7/2001 |
| WO | WO-0171654 | 9/2001 |
| WO | WO-02077870 | 10/2002 |
| WO | WO-2005106638 | 11/2005 |

OTHER PUBLICATIONS

U.S. Appl. No. 11/066,800, Wang.
U.S. Appl. No. 11/067,193, Yang.
U.S. Appl. No. 11/089,189, Wang.
U.S. Appl. No. 11/142,844, Wang.
U.S. Appl. No. 12/131,810, Wang.
U.S. Appl. No. 12/138,339, Wang.
U.S. Appl. No. 12/180,484, Wang.
"Vpen, Revolutionizing Human Interaction With The Digital World™," OTM Technologies, pp. 1-6, Jul. 15, 2002.
Brush, A.J. et al., "Robust Annotation Positioning in Digital Documents," SIGCHI '01, Mar. 31-Apr. 4, 2001, ACM, Seattle, Washington, USA, pp. 285-292.
Cai, Z., "A New Decode Algorithm for Binary Bar Codes," Pattern Recognition Letters 15 (Dec. 1994), pp. 1191-1199.
Champaneria, "PADCAM: A Real-Time, Human-Centric Notetaking System," MIT Laboratory for Computer Science, Mar. 2002.
Clark et al., "Maximal and Near-Maximal Shift Register Sequences: Efficient Event Counters and Easy Discrete Logarithms," IEEE Transactions on Computers vol. 43, No. 5, pp. 560-568, May 1994.
Cotting, D. et al., "Embedding Imperceptible Patterns into Projected Images for Simultaneous Acquisition and Display," Proceedings of the Third IEEE and ACM International Symposium on Mixed and Augmented Reality, Nov. 2-5, 2004, IEEE Computer Society, Washington, DC, pp. 100-109.
Crowley et al., "*Thingss That See*," Communications of the A.C.M., vol. 43, No. 3, pp. 54-64, Mar. 2000.
Decurtins, C. et al., "Digital Annotation of Printed Documents," Proceedings of the Twelfth International Conference on Information and Knowledge Management Nov. 3-8, New Orleans, Louisiana, United States, CIKM'03. ACM 2003, pp. 552-555.
Dey, et al., "A Fast Algorithm for Computing the Euler Number of an Image and its VLSI Implementation," IEEE; 13th International Conference on VLSI Design, Jan. 2003.
Dumer et al., "Hardness of Approximating the Minimum Distance of a Linear Code," IEEE Symposium of Foundations of Computer Science, pp. 475-485, 1999.
European Search Report for Application No. EP 03021235; Applicant: Microsoft Corporation; Date of Mailing: Jun. 1, 2006 (2 pages).
European Search Report for Application No. EP 03021852; Applicant: Microsoft Corporation; Date of Mailing: Mar. 2, 2004 (3 pages).
European Search Report for Application No. EP 05000170.0-1527; Applicant: Microsoft Corporation; Date of Mailing: Jan. 6, 2005 (7 pages).
European Search Report for Application No. 03021224.5; Applicant: Microsoft Corporation; Date of Mailing: Jun. 1, 2005 (3 pages).
European Search Report for Application No. 03021236.9; Applicant: Microsoft Corporation; Date of Mailing: Sep. 16, 2005 (5 Pages).
European Search Report for Application No. 03021237.7-1527, Applicant: Microsoft Corporation; Date of Mailing: Jan. 6, 2005 (4 pages).
European Search Report for Application No. EP050000749; Applicant: Microsoft Corporation; Date of Mailing: Apr. 26, 2007 (2 pages).
European Search Report, Application No. 03021238.5-1527; Applicant: Microsoft Corporation; Date of Mailing: Jun. 1, 2005 (6 pages).
Fujieda et al., "Development Of Pen-Shaped Scanners," Nec, vol. 51, No. 10, 1998.

Golovchinsky, G. and Denoue, L., "Moving Markup: Repositioning Freeform Annotations," UIST '02, Oct. 27-30, 2002, Paris, France, vol. 4, Issue 2, pp. 21-24.
Gonzalez, Rafael et al., "Digital Image Processing," Table of Contents and Preface, Second Edition, Prentice Hall, Upper Saddle River, New Jersey, 2002 (13 pages).
Grasso et al., "Augmenting Recommender Systems by Embedding Interfaces into Practices," pp. 267-275, 1999.
Guerrero, J.J. and Sagues, C. "From Lines to Homographies Between Uncalibrated Images," IX Symposium on Pattern Recognition and Image Analysis, VO4, 233-240, 2001.
Haynes, "Wacom PL-500," www.wacom.com.uk, Jul. 15, 2002.
Hecht, D.L., "Printed embedded data graphical user interfaces," Computer vol. 34, Issue 3, Mar. 2001, pp. 47-55.
IEEExplore # Search Session History, May 7, 2008, http://ieee.org/search/history.jsp, 1 page.
International Search Report for Application No. PCT/US2006/032230; Applicant: Microsoft Corporation; Date of Mailing: Jan. 9, 2007 (3 pages).
Internet Print Out: "(Electro-Magnetic Resonance) send and position sensing technology," Wacom, Technology, http://www.wacom-components.com/tech.asp, pp. 1-6, Jul. 15, 2002.
Internet Print Out: "Anoto Pen Bluetooth," Tabletpccorner, http://www.tabletpccorner.net, dated Sep. 5, 2003.
Internet Print Out: "Competitive Technologies' Investee Introduces N-Scribe Pen—Digital Ink Presents Wireless Pen At Demo 2001," Competitive Technologies, http://www.competitivetech, dated Sep. 5, 2003.
Internet Print Out: "Cordless Batteryless Pen," Wacom Penabled, Components, http://www.wacom.com/components/index.cfm, dated Jul. 15, 2002.
Internet Print Out: "DataGlyphs®: Embedding Digital Data," Parc Solutions, http://www.parc.com/solutions/dataglyphs/, dated Jul. 15, 2002.
Internet Print Out: "Digital Pens," http://www.anotofunctionality.com/navigate.asp?PageID=96, pp. 1-70, Sep. 26, 2002.
Internet Print Out: "Jot This—Nscribe Pen," PC Magazine, http://ww.pcmag.com/article2/0,4149,316500,00.asp, dated Jul. 15, 2002.
Internet Print Out: "Jot This—Nscribe Pen," PC Magazine, http://ww.pcmag.com/article2/0,4149,316500,00.asp, dated Sep. 5, 2003.
Internet Print Out: "Maxell Digital Pen To Use Anoto System," Gizmo, http://www.gizmo.com.au/, dated Sep. 5, 2003.
Internet Print Out: "Mimio—Products," Mimio, http://www.mimio.com, pp. 1-8, Sep. 5, 2003.
Internet Print Out: "*N-Scribe for Digital Writing*," Flash Commerce News, http://flashcommerce.com/articles/, dated Sep. 5, 2003.
Internet Print Out: "N-Scribe For Digital Writing," Mobileinfo.com, News issue #2001—15 (Apr. 2001), http://www.mobileinfo.com/News_2001/Issue15/Digital-nscribe.htm, dated Jul. 15, 2002.
Internet Print Out: "Navilite—Optical Opportunities—Bluetooth-enabled optical transition measurement technology paves the way for an untethered stylus that can write on any surface," vol. 8, Issue No. 34, Jul. 5-11, 2002. www.computerworld.com, dated Aug. 15, 2002.
Internet Print Out: "OTM Technologies—V Pen," searched http://www.otmtech.com/vpen3.asp, pp. 1-7, Jul. 15, 2002.
Internet Print Out: "PL-500—15.1 inch Screen Digital LCD Pen Tablet System," Wacom Graphics Tablet Solution, http://ap.wacm.co.jp/products/pl/contents/pl500.html, pp. 1-13, 2002.
Internet Print Out: "Preprocessing in the Npen++ System," http://www.is.cs.cmu.edu/mie/multimodal_npen_preproc.html, dated Aug. 8, 2002.
Internet Print Out: "RF Pen Sends Your Scribbles," Appliance Manufacturing Magazine, http://www.ammagazine.com. Dated Sep. 26, 2002.
Internet Print Out: "SMART Board Interactive Whiteboard," Smarttech, http://www.smarttech.com, pp. 1-26, Sep. 5, 2003.
Internet Print Out: "The Hot New Medium: Paper—How The Oldest Interface In The Book is Redrawing The Map Of The Networked World," http://www.wired.com/wired/, dated Sep. 5, 2003.
Internet Print Out: "Anoto functionality," News, dated Jul. 15, 2002.
Internet Print Out: "Anoto functionality," Showroom, dated Jul. 15, 2002.

Internet Print Out: "ChatPen CHA-30," Digital Pens, Anoto Functionality, dated Jul. 15, 2002.
Internet Print Out: "Cintiq18SX—A Powerful New Way To Work Directly On The Screen," Wacom Technology, Cintiq-Interactive Pen Display, dated Sep. 5, 2003.
Internet Print Out: "Communicate Digitally With Ordinary Pen and Paper," Anoto Functionality, dated Jul. 15, 2002.
Internet Print Out: "Creating A Global De Facto Standard," Anoto Functionality, dated Jul. 15, 2002.
Internet Print Out: "Daily News," dated Aug. 15, 2002.
Internet Print Out: "Digital Pens and Technical Data," Anoto Functionality, dated Jul. 15, 2002.
Internet Print Out: "Downloads," Anoto Functionality, dated Jul. 15, 2002.
Internet Print Out: "Optical Translation Measurement (OTM™)," Technologies, dated Jul. 15, 2002.
Internet Print Out: "Partners Supporting Anoto Functionality," Anoto Functionality, dated 15, 2002.
Internet Print Out: "Possibilities," Anoto Functionality, dated Jul. 15, 2002.
Internet Print Out: "Product VPen™," OTM Technologies, dated Jul. 15, 2002.
Internet Print Out: "Products—Get Everyone On The Same Page," Mimio, dated Sep. 5, 2003.
Internet Print Out: "Sensor Board and Pen," Wacom, Product, dated Jul. 15, 2002.
Internet Print Out: "The Solution," Anoto Functionality, dated Jul. 15, 2002.
Internet Print Out: "Vision and Mission," Anoto Functionality, dated Jul. 15, 2002.
Internet Print Out: "Wacom Displays Pressure-Sensitive Pen Sensor for Tablet PCs," Wacom, News, dated Jul. 15, 2002.
Internet Print Out: "Welcome To www.anoto.com," Anoto, dated Jul. 15, 2002.
Internet Printout—http://www.anoto.com: Construction, Sep. 5, 2003.
Internet Printout—http://www.anoto.com: Page template, Sep. 5, 2003.
Internet Printout—http://www.anoto.com: Paper and Printing, Sep. 5, 2003.
Internet Printout—http://www.anoto.com: Paper space, Sep. 5, 2003.
Internet Printout—http://www.anoto.com: Pattern, Sep. 5, 2003.
Internet Printout—http://www.anoto.com: Printers supporting Anoto functionality, Sep. 5, 2003.
Internet Printout—http://www.anotofunctionality.com: Anoto Functionality—Anoto pattern & digital paper, Sep. 26, 2006.
Internet Printout—http://www.anotofunctionality.com: Anoto Functionality—Anoto pattern & digital paper, Sep. 5, 2003.
Internet Printout—http://www.anotofunctionality.com: Anoto Functionality—Applications, Sep. 5, 2003.
Internet Printout—http://www.anotofunctionality.com: Anoto Functionality—Corporate applications, Sep. 5, 2003.
Internet Printout—http://www.anotofunctionality.com: Anoto Functionality—Digital notes, Sep. 5, 2003.
Internet Printout—http://www.anotofunctionality.com: Anoto Functionality—Digital paper, Sep. 26, 2002.
Internet Printout—http://www.anotofunctionality.com: Anoto Functionality—Digital paper, Sep. 5, 2003.
Internet Printout—http://www.anotofunctionality.com: Anoto Functionality—Digital pens Use with mobile phones, Sep. 5, 2003.
Internet Printout—http://www.anotofunctionality.com: Anoto Functionality—Digital Pens Use with personal computers, Sep. 26, 2002.
Internet Printout—http://www.anotofunctionality.com: Anoto Functionality—Digital Pens, Sep. 26, 2002.
Internet Printout—http://www.anotofunctionality.com: Anoto Functionality—Digital pens, Sep. 5, 2003.
Internet Printout—http://www.anotofunctionality.com: Anoto Functionality—Digital service, Sep. 26, 2002.
Internet Printout—http://www.anotofunctionality.com: Anoto Functionality—Digital service, Sep. 5, 2003.
Internet Printout—http://www.anotofunctionality.com: Anoto Functionality—E-mail, Sep. 5, 2003.
Internet Printout—http://www.anotofunctionality.com: Anoto Functionality—Fax, Sep. 5, 2003.
Internet Printout—http://www.anotofunctionality.com: Anoto Functionality—Freedom of expression, Sep. 26, 2002.
Internet Printout—http://www.anotofunctionality.com: Anoto Functionality—Graphical SMS, Sep. 5, 2003.
Internet Printout—http://www.anotofunctionality.com: Anoto Functionality—Hints & tips Using your digital paper, Sep. 5, 2003.
Internet Printout—http://www.anotofunctionality.com: Anoto Functionality—Hints & tips Using your digital pen, Sep. 5, 2003.
Internet Printout—http://www.anotofunctionality.com: Anoto Functionality—Hints & tips Using Your Digital Service, Sep. 5, 2003.
Internet Printout—http://www.anotofunctionality.com: Anoto Functionality—Hints & tips, Sep. 5, 2003.
Internet Printout—http://www.anotofunctionality.com: Anoto Functionality—How does it work?, Sep. 26, 2002.
Internet Printout—http://www.anotofunctionality.com: Anoto Functionality—Security, Sep. 5, 2003.
Internet Printout—http://www.anotofunctionality.com: Anoto Functionality—Software and additionals, Sep. 5, 2003.
Internet Printout—http://www.anotofunctionality.com: Anoto Functionality—What is Anoto functionality?, Sep. 5, 2003.
Internet Printout—http://www.anotofunctionality.com: Anoto Functionality—You to an organization, Sep. 26, 2002.
Internet Printout—http://www.anotofunctionality.com: Anoto Functionality—You to someone else, Sep. 26, 2002.
Internet Printout—http://www.anotofunctionality.com: Anoto Functionality—You to yourself, Sep. 26, 2002.
Internet Printout—http://www.anotofunctionality.com: Anoto® functionality brings digital life to paper products, Sep. 5, 2003.
Internet Printout—http://www.edgereview.com: The Edge—First Look: Digital Ink n-scribe, Sep. 5, 2003.
Internet Printout—http://www.flashcommerce.com: n-scribe For Digital Writing, Sep. 5, 2003.
Internet Printout—http://www.gizmo.com: Maxell Digital Pen to use Anoto system, Sep. 5, 2003.
Internet Printout—http://www.is.cs.cmu.edu: Final input representation, Aug. 8, 2002.
Internet Printout—http://www.is.cs.cmu.edu: Npen++, Aug. 8, 2002.
Internet Printout—http://www.mimio.com: Capture, Save and Share, Sep. 5, 2003.
Internet Printout—http://www.mimio.com: Mimio technology, Sep. 5, 2003.
Internet Printout—http://www.mimio.com: Turn your whiteboard into an interactive whiteboard, Sep. 5, 2003.
Internet Printout—http://www.pcmag.com: Jot This, Sep. 5, 2003.
Internet Printout—http://www.smarttech.com: Carnegie Mellon research ranks the SMART Board™ interactive whiteboard as fastest, most accurate way to interact with projected information, Sep. 5, 2003.
Internet Printout—http://www.smarttech.com: SMART Board Interactive Whiteboard—Front Projection Features, Sep. 5, 2003.
Internet Printout—http://www.smarttech.com: SMART Board Interactive Whiteboard—Q&A, Sep. 5, 2003.
Internet Printout—http://www.smarttech.com: SMART Board Interactive Whiteboard, Sep. 5, 2003.
Internet Printout—http://www.smarttech.com: SMART Camfire™, whiteboard camera system effortlessly saves dry-erase whiteboard notes, Sep. 5, 2003.
Internet Printout—http://www.smarttech.com: SMART Technologies Inc. awarded another U.S. patent for touch sensitive Smart Board™ technology, Sep. 5, 2003.
Internet Printout—http://www.smarttech.com: SMART Technologies, Inc. Press Releases, Sep. 5, 2003.
Internet Printout—http://www.smarttech.com: SMART Technologies, Inc., New annotation and software functionality on all Smart Board™ Interactive Whiteboards, Sep. 5, 2003.
Internet Printout—http://www.smarttech.com: What's New, Sep. 5, 2003.
Internet Printout—http://www.smarttech.com: Press Releases—SMART launches Research Assistance Program, Sep. 5, 2003.

Internet Printout—http://www.smarttech.com SMART Board Interactive Whiteboard Profiles—Sep. 5, 2003.
Internet Printout—http://www.smarttech.com: SMART Board Software Features—Sep. 5, 2003.
Internet Printout—http://www.tabletpccorner.com: Anoto Pen Bluetooth, Sep. 5, 2003.
Internet Printout—http://www.techtv.com: Nscribe Pen and Presenter-to-Go, Sep. 5, 2003.
Internet Printout—http://www.wacom.com: Cintiq—Interactive Pen Display, Sep. 5, 2003.
Internet Printout—http://www.wacom.com: Graphire2—Have more fun with digital phones, Sep. 5, 2003.
Internet Printout—http://www.wacom.com: Intuos2—The Professional Tablet, Sep. 5, 2003.
Internet Printout—http://www.wacom.com: intuos2, Sep. 5, 2003.
Internet Printout—http://www.wacom.com: Penabled Wacom, Sep. 5, 2003.
Internet Printout—http://www.wacom.com: tablet PC, Sep. 5, 2003.
Internet Printout—http://www.wired.com: The Hot New Medium: Paper, Sep. 5, 2003.
Jelinek, Frederic, "Statistical Methods for Speech Recognition," The MIT Press, pp. 1-283, 2001.
Ko et al., "Finger Mouse and Gesture Recognition System As A New Human Computer Interface," Computer and Graphics, col. 21, No. 5, pp. 555-561, 1997.
Lau, R., "Adaptive Statistical Language Modeling," Submitted to the Dept. of Electrical Engineering and Computer Science in Partial Fulfillment for the Degree of Master of Science at the MIT, May 1994.
Lee, Kai-Fu, "Automatic Speech Recognition—The Development of the SPHINX System," Kluwer Academic Publishers, pp. 1-207, 1992.
Louderback, Jim, "Nscribe pen And Presenter-To-Go—Infrared Pen And New Springboard Module Make Their Debut At Demo 2001," Edgereview.com, http://www.techtv.com/freshgear.pr, dated Sep. 5, 2003.
Moran, et al., "Design and Technology for Collaborage: Collaborative Collages of Information on Physical Walls," Nov. 1999.
Munich, M.E.; Perona, P., "Visual Input for Pen-Based Computers," Image Processing, 1996, Proceedings International Conference on Sep. 16-19, 1996. vol. 1, pp. 173- 176.
Nathan, K.S. et al., "On-Line Handwriting Recognition Using Continuous Parameter Hidden Markov Models," 1993 IEEE.
Okad, et al. "A Method for Document Digitizer by Real Time Assembling of Mosaic Pictures," Scripta Publishing Co., Systems, Computers, Controls, vol. 13, No. 5, Sep. 1982, pp. 74-80.
Okada et al., "A High-Resolution Handwriting Character Input Device Using Laser Beams," Department of Instrumentation Engineering, Faculty of Science and Technology, vol. 10.4, No. 11.1, 1981.
Otsu, Nobuyuki, "A Threshold Selection Method From Gray-Level Histogram," IEEE Transactions on Systems, Man, And Cybernetics, Jan. 1979, vol. SMC-9, No. 1, pp. 62-66.
Pursley, M. et al., "Numerical Evaluation of Correlation Parameters for Optimal Phrases of Binar Register Sequences," Communications, IEEE Transactions on Oct. 1979, vol. 27, Issue 10, Part 1, pp. 1597-1604.
Reynaerts, D. et al., "Design of an advanced computer writing tool," Micro Machine and Human Science, Proceedings of the Sixth International Symposium, Nagoya, Japan, Oct. 4-6, 1995, pp. 229-234.
Sato et al., "Novel device for Inputting Handwriting Trajectory," Ricoh Technical Report No. 27, Nov. 2001, pp. 52-59, http://www.ricoh.co.jp/rdc/techreport/No27/Ronbun.A2707.pdf.
Sato et al., "Video Tablet—2D Coordinate Input Device With OCD Camera," Osaka University, vol. J67-D, No. 6, Jun. 1984.
Shum, Heung-Yeung, et al., "Panoramic Image Mosaics," Microsoft Research Technical Report MSR-TR-97-23, 1997, 53 pages.
Tang, Xiaoou et al., "Video-based handwritten Chinese character recognition," Circuits and Systems for Video Technology, IEEE Transactions, Jan. 2005, vol. 15, Issue 1, pp. 167-174.
Urbanski, Brian "Don't Break This Ink Pen," Edgereview.com, http://www.edgereview.com/ataglance.cfm?category=edge&ID=180, dated Jul. 15, 2002.
Urbanski, Brian, "Don't Break This Ink Pen," Edgereview.com, http://www.edgereview.com/ataglance.cfm?category=edge&ID=180, dated Sep. 5, 2003.
Van Liere, R., and Mulder, J.D., "Optical Tracking Using Projective Invariant Marker Patten Properties," Virtual Reality, 2003. Proceedings, IEEE, Mar. 22-26, 2003, pp. 191-198.

* cited by examiner

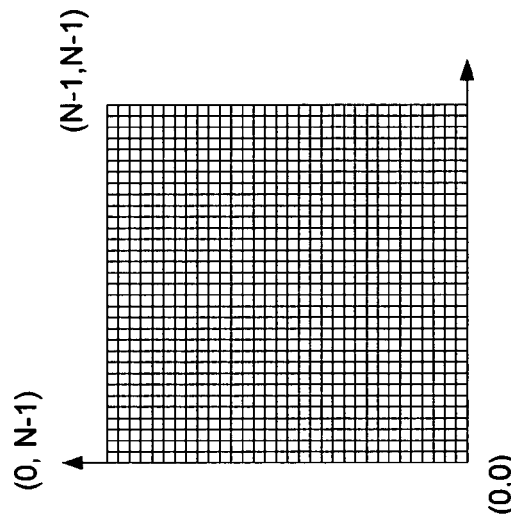
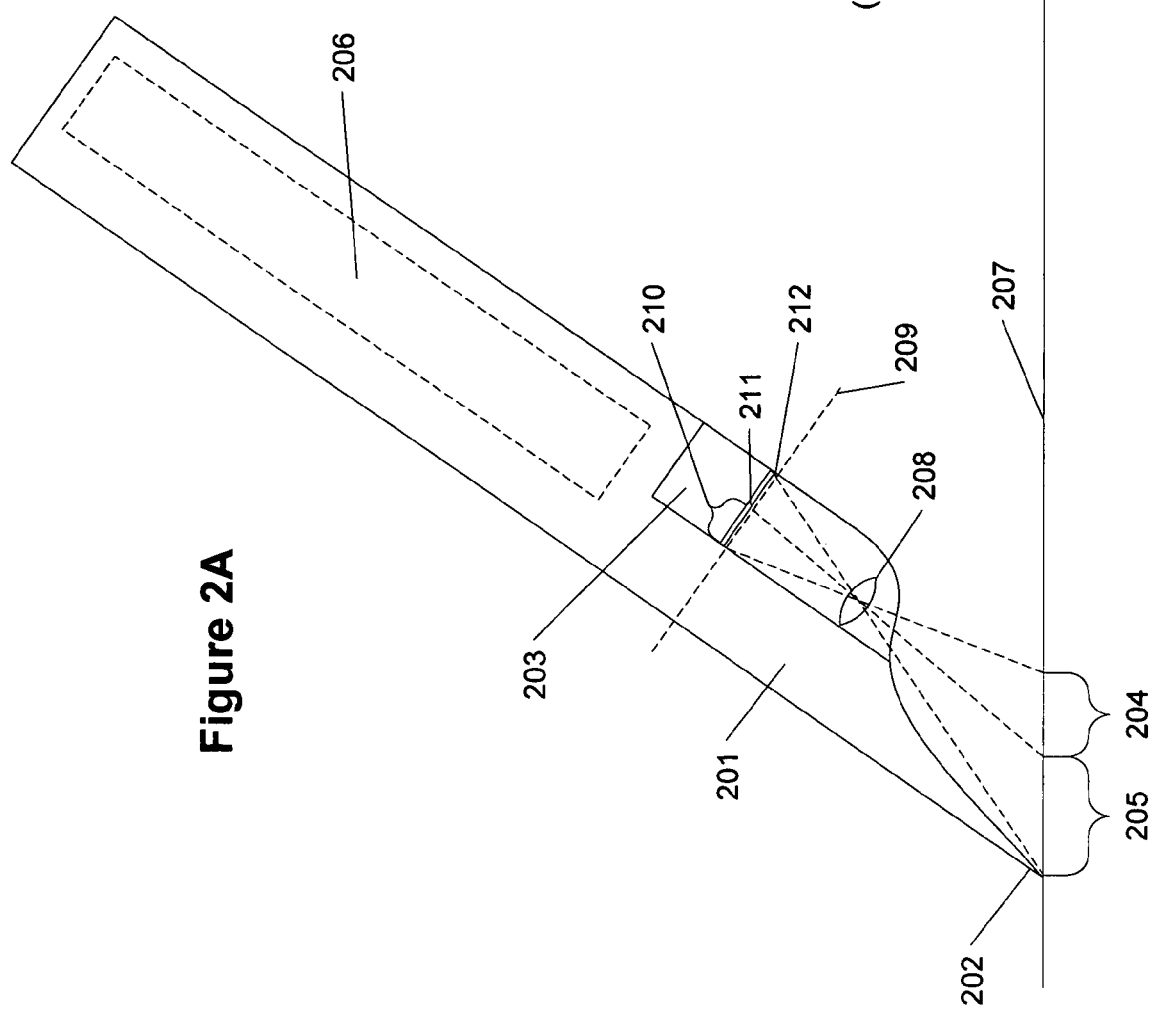
Figure 2A
Figure 2B

Figure 3A    0000010 00 01100 0101 001 111010 0 011001 0 010110 111 0110 01101 01 0111111
Figure 3B    0000000 0011101 0100111 1110100 0111010 1000101 1110100 0100111 0011101
Figure 3C    0001001000 001111110 010111101 010011001 011100111 001011010 011000011
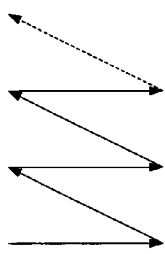
Figure 3E
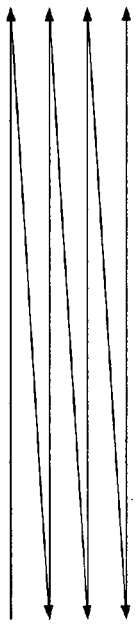
Figure 3F
Figure 3D

   
Figure 5A Figure 5B Figure 5C Figure 5D
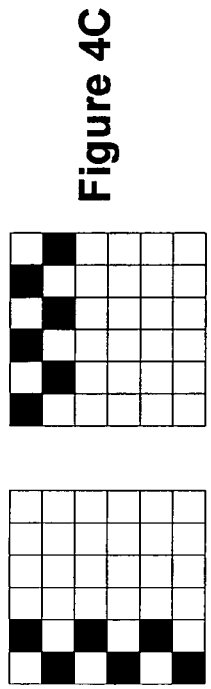
Figure 4C
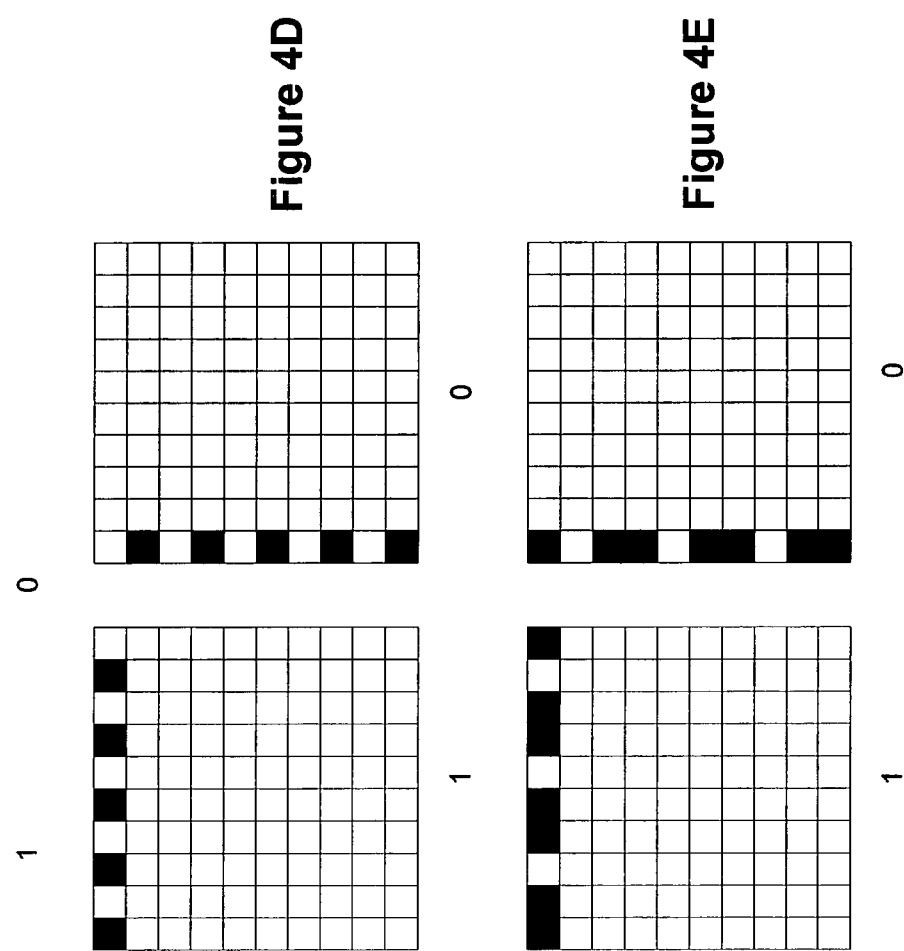
Figure 4D
Figure 4E

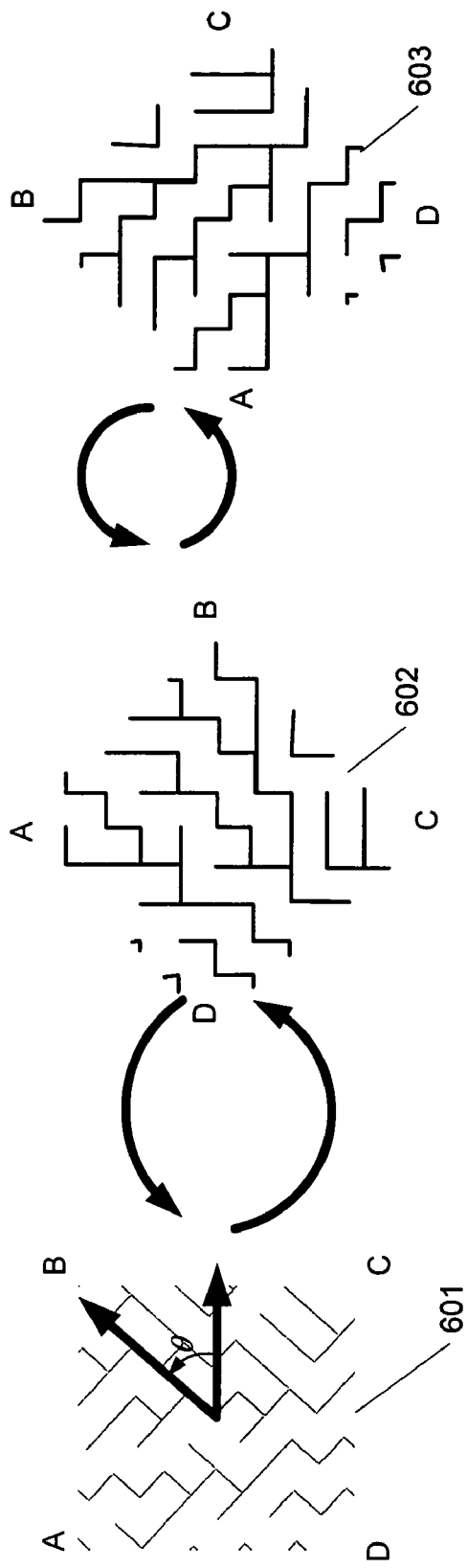

Performance Review

Review Period: 1701 to 1703  Review Date: 1705

Name: 1707  Manager Name: 1709

Title: 1711  Department: 1713

ID Number: 1715

E-mail Address: 1717

1700

Skills Table

| Competency | Employee Rating 1719 | | | | | | Manager Rating 1721 | | | | | |
|---|---|---|---|---|---|---|---|---|---|---|---|---|
| | 1 | 2 | 3 | 4 | 5 | n/a | 1 | 2 | 3 | 4 | 5 | n/a |
| Problem solving | ○ | ○ | ○ | ○ | ○ | ⊙ | ○ | ○ | ○ | ○ | ○ | ⊙ |
| Decision making | ○ | ○ | ○ | ○ | ○ | ⊙ | ○ | ○ | ○ | ○ | ○ | ⊙ |
| Long-term thinking | ○ | ○ | ○ | ○ | ○ | ⊙ | ○ | ○ | ○ | ○ | ○ | ⊙ |
| Results oriented | ○ | ○ | ○ | ○ | ○ | ⊙ | ○ | ○ | ○ | ○ | ○ | ⊙ |
| Organization and prioritization | ○ | ○ | ○ | ○ | ○ | ⊙ | ○ | ○ | ○ | ○ | ○ | ⊙ |
| Flexibility and change management | ○ | ○ | ○ | ○ | ○ | ⊙ | ○ | ○ | ○ | ○ | ○ | ⊙ |
| Customer service | ○ | ○ | ○ | ○ | ○ | ⊙ | ○ | ○ | ○ | ○ | ○ | ⊙ |
| Company representation | ○ | ○ | ○ | ○ | ○ | ⊙ | ○ | ○ | ○ | ○ | ○ | ⊙ |
| Communication | ○ | ○ | ○ | ○ | ○ | ⊙ | ○ | ○ | ○ | ○ | ○ | ⊙ |
| Conflict management | ○ | ○ | ○ | ○ | ○ | ⊙ | ○ | ○ | ○ | ○ | ○ | ⊙ |
| Self-confidence | ○ | ○ | ○ | ○ | ○ | ⊙ | ○ | ○ | ○ | ○ | ○ | ⊙ |
| Integrity and reliability | ○ | ○ | ○ | ○ | ○ | ⊙ | ○ | ○ | ○ | ○ | ○ | ⊙ |

Signatures  1723

Sign and print your name.

Employee _____  Date _____

Manager _____  Date _____

Senior Manager _____  Date _____

Group Manager _____  Date _____

FIG. 17

EMBEDDED INTERACTION CODE DOCUMENT

TECHNICAL FIELD

The present invention relates to printing a document for use with a digital pen. More particularly, the present invention relates to creating an embedded interaction code (EIC) document that serves as an intermediate tier between a paper document and a corresponding digital document.

BACKGROUND

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations placed on it by the user. One of the difficulties, however, with having a printed document with annotations is the need to have the annotations subsequently entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations is needed.

One technique of capturing handwritten information is by using an image capturing pen whose location may be determined during writing. One image capturing pen that provides this capability is the Anoto pen by Anoto Inc. This pen functions by using a camera to capture an image of paper encoded with a predefined pattern. An example of the image pattern is shown in FIG. 11. This pattern is used by the Anoto pen (by Anoto Inc.) to determine a location of an image capturing pen on a piece of paper.

A user may wish to access and annotate any one of a number of digital documents, which may be further specified by a document version. Moreover, an associated paper document is typically partitioned into a number of pages, which may be hundreds of pages. It is important that an application know the exact page of a stroke (ink) to associate the stroke to the paper document. Once the page is identified, it is necessary to determine the location of the stroke on the page.

Thus, it would be desirable to facilitate accessing a digital document and to synchronize an associated paper document that a user may annotate and save as a digital document. Moreover, it would be desirable to facilitate locating strokes in the paper document as the user is annotating the paper document and to save the annotated document as a digital document.

SUMMARY

Aspects of the present invention provide solutions to at least one of the issues mentioned above, synchronizing a paper document to an associated digital document by establishing a mapping. An embedded interactive code (EIC) document is created as a digital file that serves as an intermediate tier between the paper document and the digital document. Both the paper document and the EIC document are generated during the printing process. The EIC document records the corresponding EIC array allocations and a unique document identification number. An image capturing pen may generate a stroke on any page of paper document, which corresponds to a corresponding portion in the whole EIC array. With the EIC document, the methods and apparatuses inform an application of the page and location on the page of the stroke.

With an aspect of the invention, an EIC document object associates a region on a paper document with objects in a corresponding digital document. When an image capturing pen generates a stroke, the stroke may be associated with the EIC document object.

With another aspect of the invention, a client-server relationship facilitates the creation and maintenance of an EIC document. An application and supporting image capturing pen software resides on the client. The server supports an EIC document center. The client may access an EIC document by providing a document identification.

With another aspect of the invention, a command control region may be generated on a paper document. When an image capturing pen strikes a specific portion of the command control region, a corresponding command request is sent to an application.

With another aspect of the invention, a stroke is associated with a field of a form. The stroke may be converted into a text equivalent or may be preserved if the stroke (e.g., an associated user's signature) is necessary to maintain its originality.

These and other aspects of the present invention will become known through the following drawings and associated description.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 2A and 2B show an image capture system and corresponding captured image in accordance with embodiments of the present invention.

FIGS. 3A through 3F show various sequences and folding techniques in accordance with embodiments of the present invention.

FIGS. 4A through 4E show various encoding systems in accordance with embodiments of the present invention.

FIGS. 5A through 5D show four possible resultant corners associated with the encoding system according to FIGS. 4A and 4B.

FIG. 6 shows rotation of a captured image portion in accordance with embodiments of the present invention.

FIG. 7 shows various angles of rotation used in conjunction with the coding system of FIGS. 4A through 4E.

FIG. 17 shows an exemplary embodiment of an InfoPath form according to an embodiment of the invention.

DETAILED DESCRIPTION

Aspects of the present invention relate to creating and maintaining an embedded interaction code (EIC) document that serves as an intermediate tier between a paper document and a digital document.

The following is separated by subheadings for the benefit of the reader. The subheadings include: Terms, General-Purpose Computer, Image Capturing Pen, Encoding of Array, Decoding, Error Correction, Location Determination, and Embedded Interaction Code (EIC) Document.

Terms

Pen—any writing implement that may or may not include the ability to store ink. In some examples, a stylus with no ink capability may be used as a pen in accordance with embodiments of the present invention.

Camera—an image capture system that may capture an image from paper or any other medium.

General Purpose Computer

Figure 1:
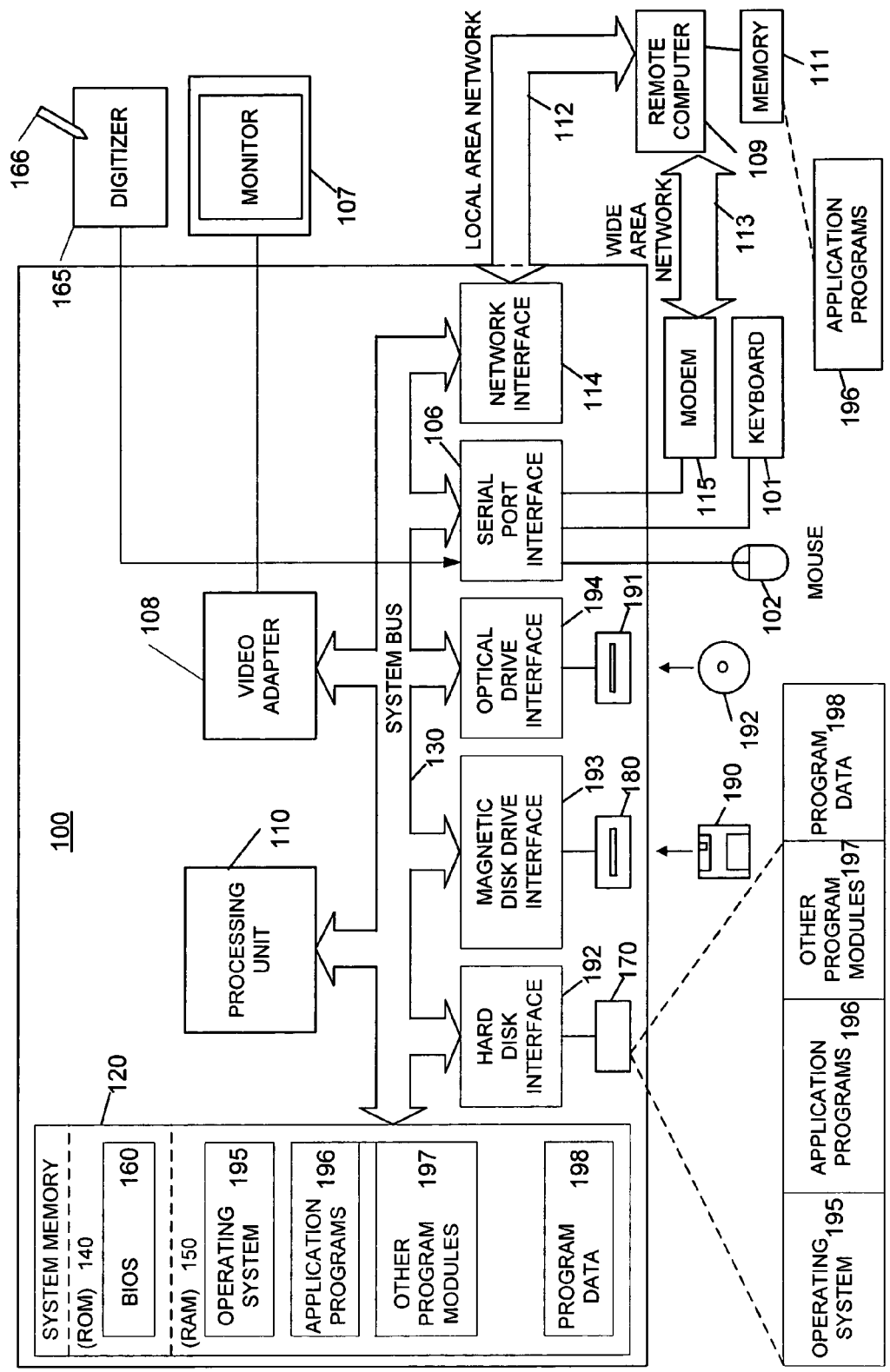
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Pen

Aspects of the present invention include placing an encoded data stream in a displayed form that represents the encoded data stream. (For example, as will be discussed with FIG. 4B, the encoded data stream is used to create a graphical pattern.) The displayed form may be printed paper (or other physical medium) or may be a display projecting the encoded data stream in conjunction with another image or set of images. For example, the encoded data stream may be represented as a physical graphical image on the paper or a graphical image overlying the displayed image (e.g., representing the text of a document) or may be a physical (non-modifiable) graphical image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing images with a camera in the pen or stylus as the pen or stylus traverses a document, the system can track movement of the stylus being controlled by the user. The displayed or printed image may be a watermark associated with the blank or content-rich paper or may be a watermark associated with a displayed image or a fixed coding overlying a screen or built into a screen.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 (i.e., the resolution of the image sensor of the camera) is 32×32 pixels (where N=32). In the embodiment, a captured image (32 pixels by 32 pixels) corresponds to an area of approximately 5 mm by 5 mm of the surface plane captured by camera 203. Accordingly, FIG. 2B shows a field of view of 32 pixels long by 32 pixels wide. The size of N is adjustable, such that a larger N corresponds to a higher image resolution. Also, while the field of view of the camera 203 is shown as a square for illustrative purposes here, the field of view may include other shapes as is known in the art.

The images captured by camera 203 may be defined as a sequence of image frames $\{I_i\}$, where $I_i$ is captured by the pen 201 at sampling time $t_i$. The sampling rate may be large or small, depending on system configuration and performance requirement. The size of the captured image frame may be large or small, depending on system configuration and performance requirement.

The image captured by camera 203 may be used directly by the processing system or may undergo pre-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5 pixels, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211.

The following transformation $F_{S \to P}$ transforms position coordinates in the image captured by camera to position coordinates in the real image on the paper:

$$L_{paper} = F_{S \to P}(L_{Sensor})$$

During writing, the pen tip and the paper are on the same plane. Accordingly, the transformation from the virtual pen tip to the real pen tip is also $F_{S \to P}$:

$$L_{pentip} = F_{S \to P}(L_{virtual-pentip})$$

The transformation $F_{S \to P}$ may be estimated as an affine transform. This simplifies as:

$$F_{S \to P} = \begin{bmatrix} \frac{\sin\theta_y}{s_x} & \frac{\cos\theta_y}{s_x} & 0 \\ \frac{-\sin\theta_x}{s_y} & \frac{\cos\theta_x}{s_y} & 0 \\ 0 & 0 & 1 \end{bmatrix}$$

as the estimation of $F_{S \to P}$, in which $\theta_x$, $\theta_y$, $s_x$, and $s_y$ are the rotation and scale of two orientations of the pattern captured at location 204. Further, one can refine $F'_{S \to P}$ by matching the captured image with the corresponding real image on paper. "Refine" means to get a more precise estimation of the transformation $F_{S \to P}$ by a type of optimization algorithm referred to as a recursive method. The recursive method treats the matrix $F'_{S \to P}$ as the initial value. The refined estimation describes the transformation between S and P more precisely.

Next, one can determine the location of virtual pen tip by calibration.

One places the pen tip 202 on a fixed location $L_{pentip}$ on paper. Next, one tilts the pen, allowing the camera 203 to capture a series of images with different pen poses. For each image captured, one may obtain the transformation $F_{S \to P}$. From this transformation, one can obtain the location of the virtual pen tip $L_{virtual-pentip}$:

$$L_{virtual-pentip} = F_{P \to S}(L_{pentip})$$

where $L_{pentip}$ is initialized as (0, 0) and $$F_{P \to S} = (F_{S \to P})^{-1}$$

By averaging the $L_{virtual-pentip}$ obtained from each image, a location of the virtual pen tip $L_{virtual-pentip}$ may be determined. With $L_{virtual-pentip}$, one can get a more accurate estimation of $L_{pentip}$. After several times of iteration, an accurate location of virtual pen tip $L_{virtual-pentip}$ may be determined.

The location of the virtual pen tip $L_{virtual-pentip}$ is now known. One can also obtain the transformation $F_{S \to P}$ from the images captured. Finally, one can use this information to determine the location of the real pen tip $L_{pentip}$:

$$L_{pentip} = F_{S \to P}(L_{virtual-pentip})$$

Encoding of Array

A two-dimensional array may be constructed by folding a one-dimensional sequence. Any portion of the two-dimensional array containing a large enough number of bits may be used to determine its location in the complete two-dimensional array. However, it may be necessary to determine the location from a captured image or a few captured images. So as to minimize the possibility of a captured image portion being associated with two or more locations in the two-dimensional array, a non-repeating sequence may be used to create the array. One property of a created sequence is that the sequence does not repeat over a length (or window) n. The following describes the creation of the one-dimensional sequence then the folding of the sequence into an array.

Sequence Construction

A sequence of numbers may be used as the starting point of the encoding system. For example, a sequence (also referred to as an m-sequence) may be represented as a q-element set in field $F_q$. Here, $q=p^n$ where n 1 and p is a prime number. The sequence or m-sequence may be generated by a variety of different techniques including, but not limited to, polynomial division. Using polynomial division, the sequence may be defined as follows:

$$\frac{R_l(x)}{P_n(x)}$$

where $P_n(x)$ is a primitive polynomial of degree n in field $F_q[x]$ (having $q^n$ elements). $R_l(x)$ is a nonzero polynomial of degree l (where l<n) in field $F_q[x]$. The sequence may be created using an iterative procedure with two steps: first, dividing the two polynomials (resulting in an element of field $F_q$) and, second, multiplying the remainder by x. The computation stops when the output begins to repeat. This process may be implemented using a linear feedback shift register as set forth in an article by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568). In this environment, a relationship is established between cyclical shifting of the sequence and polynomial $R_l(x)$: changing $R_l(x)$ only cyclically shifts the sequence and every cyclical shifting corresponds to a polynomial $R_l(x)$. One of the properties of the resulting sequence is that, the sequence has a period of $q^n-1$ and within a period, over a width (or length) n, any portion exists once and only once in the sequence. This is called the "window property". Period $q^n-1$ is also referred to as the length of the sequence and n as the order of the sequence.

The process described above is but one of a variety of processes that may be used to create a sequence with the window property.

Array Construction

The array (or m-array) that may be used to create the image (of which a portion may be captured by the camera) is an extension of the one-dimensional sequence or m-sequence. Let A be an array of period ($m_1$, $m_2$), namely $A(k+m_1,l)=A(k,l+m_2)=A(k,l)$. When an $n_1 \times n_2$ window shifts through a period of A, all the nonzero $n_1 \times n_2$ matrices over $F_q$ appear once and only once. This property is also referred to as a "window property" in that each window is unique. A widow may then be expressed as an array of period ($m_1$, $m_2$) (with $m_1$ and $m_2$ being the horizontal and vertical number of bits present in the array) and order ($n_1$, $b_2$).

A binary array (or m-array) may be constructed by folding the sequence. One approach is to obtain a sequence then fold it to a size of $m_1 \times m_2$ where the length of the array is $L=m_1 \times m_2=2^n-1$. Alternatively, one may start with a predetermined size of the space that one wants to cover (for example, one sheet of paper, 30 sheets of paper or the size of a computer monitor), determine the area ($m_1 \times m_2$), then use the size to let L $m_1 \times m_2$, where $L=2^n-1$.

A variety of different folding techniques may be used. For example, FIGS. 3A through 3C show three different sequences. Each of these may be folded into the array shown as FIG. 3D. The three different folding methods are shown as the overlay in FIG. 3D and as the raster paths in FIGS. 3E and 3F. We adopt the folding method shown in FIG. 3D.

To create the folding method as shown in FIG. 3D, one creates a sequence $\{a_i\}$ of length L and order n. Next, an array $\{b_{kl}\}$ of size $m_1 \times m_2$, where $\gcd(m_1, m_2)=1$ and $L=m_1 \times m_2$, is created from the sequence $\{a_i\}$ by letting each bit of the array be calculated as shown by equation 1:

$$b_{kl}=a_i, \text{ where } k=i \bmod(m_1), l=i \bmod(m_2), i=0,\ldots,L-1. \tag{1}$$

This folding approach may be alternatively expressed as laying the sequence on the diagonal of the array, then continuing from the opposite edge when an edge is reached.

Figure 4A:
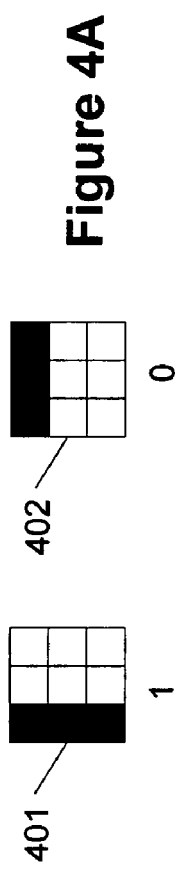
Figure 11:
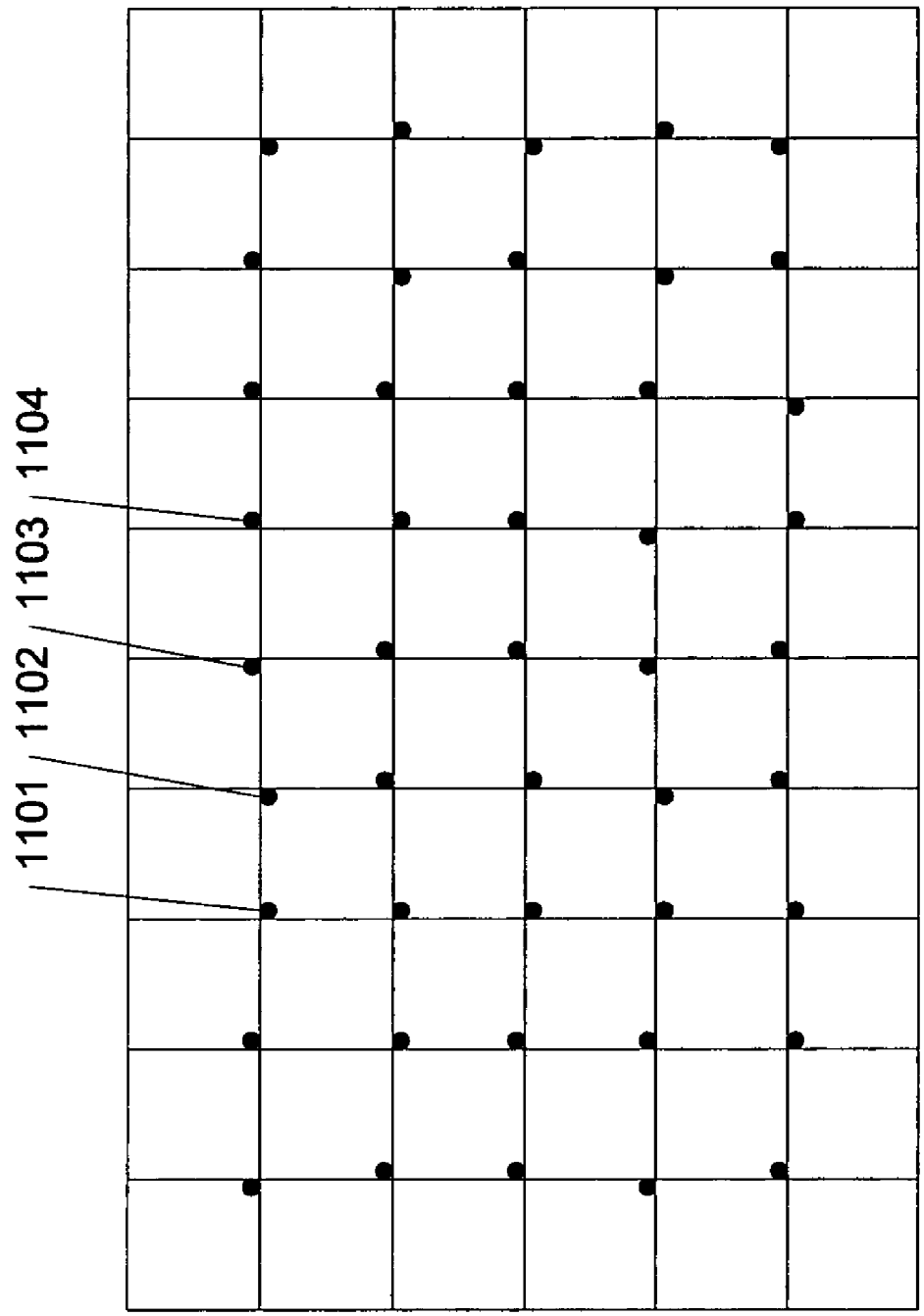
FIG. 11 shows a representation of encoding space in a document according to prior art.

FIG. 4A shows sample encoding techniques that may be used to encode the array of FIG. 3D. It is appreciated that other encoding techniques may be used. For example, an alternative coding technique is shown in FIG. 11.

Referring to FIG. 4A, a first bit 401 (for example, "1") is represented by a column of dark ink. A second bit 402 (for example, "0") is represented by a row of dark ink. It is appreciated that any color ink may be used to represent the various bits. The only requirement in the color of the ink chosen is that it provides a significant contrast with the background of the medium to be differentiable by an image capture system. The bits in FIG. 4A are represented by a 3×3 matrix of cells. The size of the matrix may be modified to be any size as based on the size and resolution of an image capture system. Alternative representation of bits 0 and 1 are shown in FIGS. 4C-4E. It is appreciated that the representation of a one or a zero for the sample encodings of FIGS. 4A-4E may be switched without effect. FIG. 4C shows bit representations occupying two rows or columns in an interleaved arrangement. FIG. 4D shows an alternative arrangement of the pixels in rows and columns in a dashed form. Finally FIG. 4E shows pixel representations in columns and rows in an irregular spacing format (e.g., two dark dots followed by a blank dot).

Referring back to FIG. 4A, if a bit is represented by a 3×3 matrix and an imaging system detects a dark row and two white rows in the 3×3 region, then a zero is detected (or one). If an image is detected with a dark column and two white columns, then a one is detected (or a zero).

Here, more than one pixel or dot is used to represent a bit. Using a single pixel (or bit) to represent a bit is fragile. Dust, creases in paper, non-planar surfaces, and the like create difficulties in reading single bit representations of data units. However, it is appreciated that different approaches may be used to graphically represent the array on a surface. Some approaches are shown in FIGS. 4C through 4E. It is appreciated that other approaches may be used as well. One approach is set forth in FIG. 11 using only space-shifted dots.

Figure 4B:
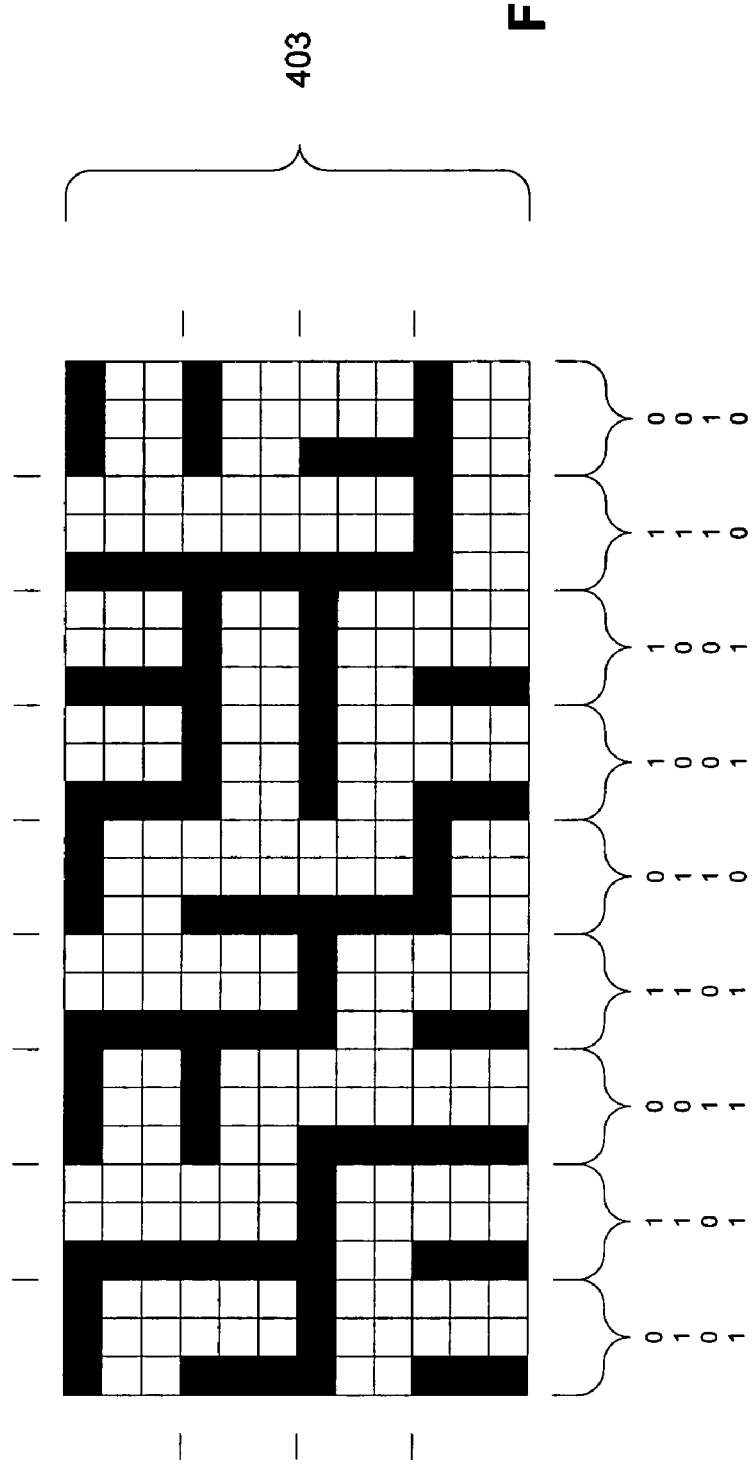

A bit stream is used to create the graphical pattern 403 of FIG. 4B. Graphical pattern 403 includes 12 rows and 18 columns. The rows and columns are formed by a bit stream that is converted into a graphical representation using bit representations 401 and 402. FIG. 4B may be viewed as having the following bit representation:

$$\begin{bmatrix} 0 & 1 & 0 & 1 & 0 & 1 & 1 & 1 & 0 \\ 1 & 1 & 0 & 1 & 1 & 0 & 0 & 1 & 0 \\ 0 & 0 & 1 & 0 & 1 & 0 & 0 & 1 & 1 \\ 1 & 0 & 1 & 1 & 0 & 1 & 1 & 0 & 0 \end{bmatrix}$$

Decoding

When a person writes with the pen of FIG. 2A or moves the pen close to the encoded pattern, the camera captures an image. For example, pen 201 may utilize a pressure sensor as pen 201 is pressed against paper and pen 201 traverses a document on the paper. The image is then processed to determine the orientation of the captured image with respect to the complete representation of the encoded image and extract the bits that make up the captured image.

For the determination of the orientation of the captured image relative to the whole encoded area, one may notice that not all the four conceivable corners shown in FIG. 5A-5D can present in the graphical pattern 403. In fact, with the correct orientation, the type of corner shown in FIG. 5A cannot exist in the graphical pattern 403. Therefore, the orientation in which the type of corner shown in FIG. 5A is missing is the right orientation.

Continuing to FIG. 6, the image captured by a camera 601 may be analyzed and its orientation determined so as to be interpretable as to the position actually represented by the image 601. First, image 601 is reviewed to determine the angle θ needed to rotate the image so that the pixels are horizontally and vertically aligned. It is noted that alternative grid alignments are possible including a rotation of the underlying grid to a non-horizontal and vertical arrangement (for example, 45 degrees). Using a non-horizontal and vertical arrangement may provide the probable benefit of eliminating visual distractions from the user, as users may tend to notice horizontal and vertical patterns before others. For purposes of simplicity, the orientation of the grid (horizontal and vertical and any other rotation of the underlying grid) is referred to collectively as the predefined grid orientation.

Next, image 601 is analyzed to determine which corner is missing. The rotation amount o needed to rotate image 601 to an image ready for decoding 603 is shown as o=(θ plus a rotation amount {defined by which corner missing}). The rotation amount is shown by the equation in FIG. 7. Referring back to FIG. 6, angle θ is first determined by the layout of the pixels to arrive at a horizontal and vertical (or other predefined grid orientation) arrangement of the pixels and the image is rotated as shown in 602. An analysis is then conducted to determine the missing corner and the image 602 rotated to the image 603 to set up the image for decoding. Here, the image is rotated 90 degrees counterclockwise so that image 603 has the correct orientation and can be used for decoding.

It is appreciated that the rotation angle θ may be applied before or after rotation of the image 601 to account for the missing corner. It is also appreciated that by considering noise in the captured image, all four types of corners may be present. We may count the number of corners of each type and choose the type that has the least number as the corner type that is missing.

Finally, the code in image 603 is read out and correlated with the original bit stream used to create image 403. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a Hamming distance between the two bit streams. It is appreciated that a variety of approaches may be used to determine the location of the recovered bit stream within the original bit stream.

As will be discussed, maze pattern analysis obtains recovered bits from image 603. Once one has the recovered bits, one needs to locate the captured image within the original array (for example, the one shown in FIG. 4B). The process of determining the location of a segment of bits within the entire array is complicated by a number of items. First, the actual bits to be captured may be obscured (for example, the camera may capture an image with handwriting that obscures the original code). Second, dust, creases, reflections, and the like may also create errors in the captured image. These errors make the localization process more difficult. In this regard, the image capture system may need to function with non-sequential bits extracted from the image. The following represents a method for operating with non-sequential bits from the image.

Let the sequence (or m-sequence) I correspond to the power series $I(x)=1/P_n(x)$, where n is the order of the m-sequence, and the captured image contains K bits of I $b=(b_0\ b_1\ b_2\ \ldots\ b_{K-1})^t$, where $K \geq n$ and the superscript t represents a transpose of the matrix or vector. The location s of the K bits is just the number of cyclic shifts of I so that $b_0$ is shifted to the beginning of the sequence. Then this shifted sequence R corresponds to the power series $x^s/P_n(x)$, or $R=T^s(I)$, where T is the cyclic shift operator. We find this s indirectly. The polynomials modulo $P_n(x)$ form a field. It is guaranteed that $x^s \equiv r_0 + r_1 x + \ldots r_{n-1} x^{n-1} \mod(P_n(x))$. Therefore, we may find $(r_0, r_1, \ldots, r_{n-1})$ and then solve for s.

The relationship $x^s \equiv r_0 + r_1 x + \ldots r_{n-1} x^{n-1} \mod(P_n(x))$ implies that $R = r_0 + r_1 T(I) + \ldots + r_{n-1} T^{n-1}(I)$. Written in a binary linear equation, it becomes:

$$R = r^t A \qquad (2)$$

where $r=(r_0\ r_1\ r_2\ \ldots\ r_{n-1})^t$, and $A=(I\ T(I)\ \ldots\ T^{n-1}(I))^t$ which consists of the cyclic shifts of I from 0-shift to (n-1)-shift. Now only sparse K bits are available in R to solve r. Let the index differences between $b_i$ and $b_o$ in R be $k_i$, $i=1,2,\ldots,k-1$, then the $1^{st}$ and $(k_i+1)$-th elements of A, $i=1,2,\ldots,k-1$, are exactly $b_o, b_1, \ldots, b_{k-1}$. By selecting the $1^{st}$ and $(k_i+1)$-th columns of A, $i=1,2,\ldots,k-1$, the following binary linear equation is formed:

$$b^t = r^t M \qquad (3)$$

where M is an n×K sub-matrix of A.

If b is error-free, the solution of r may be expressed as:

$$r^t = \tilde{b}^t \tilde{M}^{-1} \quad (4)$$

where $\tilde{M}$ is any non-degenerate n×n sub-matrix of M and $\tilde{b}$ is the corresponding sub-vector of b.

With known r, we may use the Pohlig-Hellman-Silver algorithm as noted by Douglas W. Clark and Lih-Jyh Weng, "Maximal and Near-Maximal Shift Register Sequences: Efficient Event Counters and Easy Discrete Logorithms," IEEE Transactions on Computers 43.5 (May 1994, pp 560-568) to find s so that $x^s = r_0 + r_1 x + \ldots r_{n-1} x^{n-1} \mod(P_n(x))$.

As matrix A (with the size of n by L, where $L=2^n-1$) may be huge, we should avoid storing the entire matrix A. In fact, as we have seen in the above process, given extracted bits with index difference $k_i$, only the first and $(k_i+1)$-th columns of A are relevant to the computation. Such choices of $k_i$ is quite limited, given the size of the captured image. Thus, only those columns that may be involved in computation need to saved. The total number of such columns is much smaller than L (where $L=2^n-1$ is the length of the m-sequence).

Error Correction

If errors exist in b, then the solution of r becomes more complex. Traditional methods of decoding with error correction may not readily apply, because the matrix M associated with the captured bits may change from one captured image to another.

We adopt a stochastic approach. Assuming that the number of error bits in b, $n_e$, is relatively small compared to K, then the probability of choosing correct n bits from the K bits of b and the corresponding sub-matrix $\tilde{M}$ of M being non-degenerate is high.

When the n bits chosen are all correct, the Hamming distance between $b^t$ and $r^tM$, or the number of error bits associated with r, should be minimal, where r is computed via equation (4). Repeating the process for several times, it is likely that the correct r that results in the minimal error bits can be identified.

If there is only one r that is associated with the minimum number of error bits, then it is regarded as the correct solution. Otherwise, if there is more than one r that is associated with the minimum number of error bits, the probability that $n_e$ exceeds the error correcting ability of the code generated by M is high and the decoding process fails. The system then may move on to process the next captured image. In another implementation, information about previous locations of the pen can be taken into consideration. That is, for each captured image, a destination area where the pen may be expected next can be identified. For example, if the user has not lifted the pen between two image captures by the camera, the location of the pen as determined by the second image capture should not be too far away from the first location. Each r that is associated with the minimum number of error bits can then be checked to see if the location s computed from r satisfies the local constraint, i.e., whether the location is within the destination area specified.

If the location s satisfies the local constraint, the X, Y positions of the extracted bits in the array are returned. If not, the decoding process fails.

Figure 8:
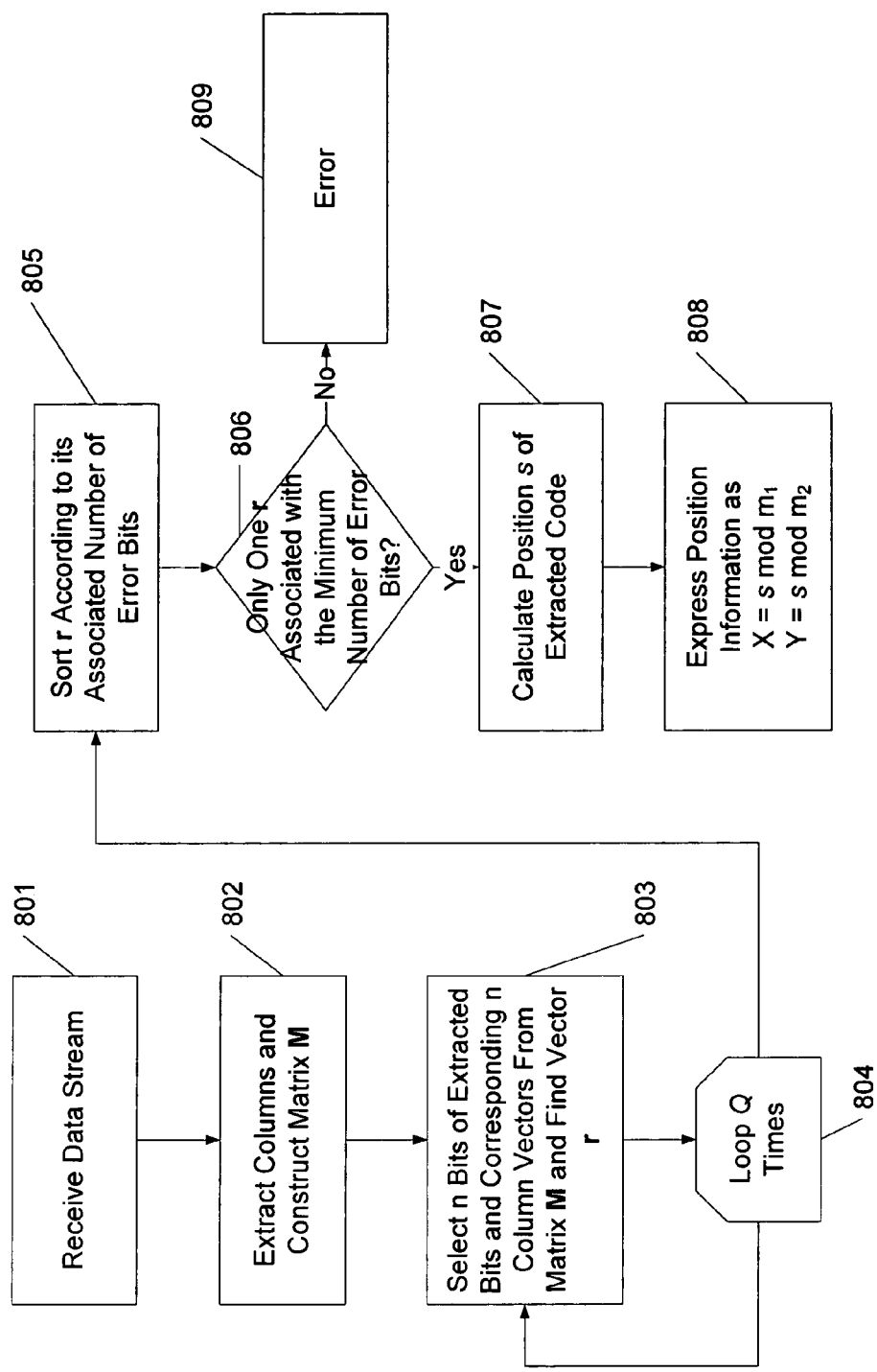
FIG. 8 shows a process for determining the location of a captured array in accordance with embodiments of the present invention.

FIG. 8 depicts a process that may be used to determine a location in a sequence (or m-sequence) of a captured image. First, in step 801, a data stream relating to a captured image is received. In step 802, corresponding columns are extracted from A and a matrix M is constructed.

In step 803, n independent column vectors are randomly selected from the matrix M and vector r is determined by solving equation (4). This process is performed Q times (for example, 100 times) in step 804. The determination of the number of loop times is discussed in the section Loop Times Calculation.

In step 805, r is sorted according to its associated number of error bits. The sorting can be done using a variety of sorting algorithms as known in the art. For example, a selection sorting algorithm may be used. The selection sorting algorithm is beneficial when the number Q is not large. However, if Q becomes large, other sorting algorithms (for example, a merge sort) that handle larger numbers of items more efficiently may be used.

The system then determines in step 806 whether error correction was performed successfully, by checking whether multiple r's are associated with the minimum number of error bits. If yes, an error is returned in step 809, indicating the decoding process failed.

If not, the position s of the extracted bits in the sequence (or m-sequence) is calculated in step 807, for example, by using the Pohig-Hellman-Silver algorithm.

Next, the (X,Y) position in the array is calculated as: x=s mod $m_1$ and y=s mod $m_2$ and the results are returned in step 808.

Location Determination

Figure 9:
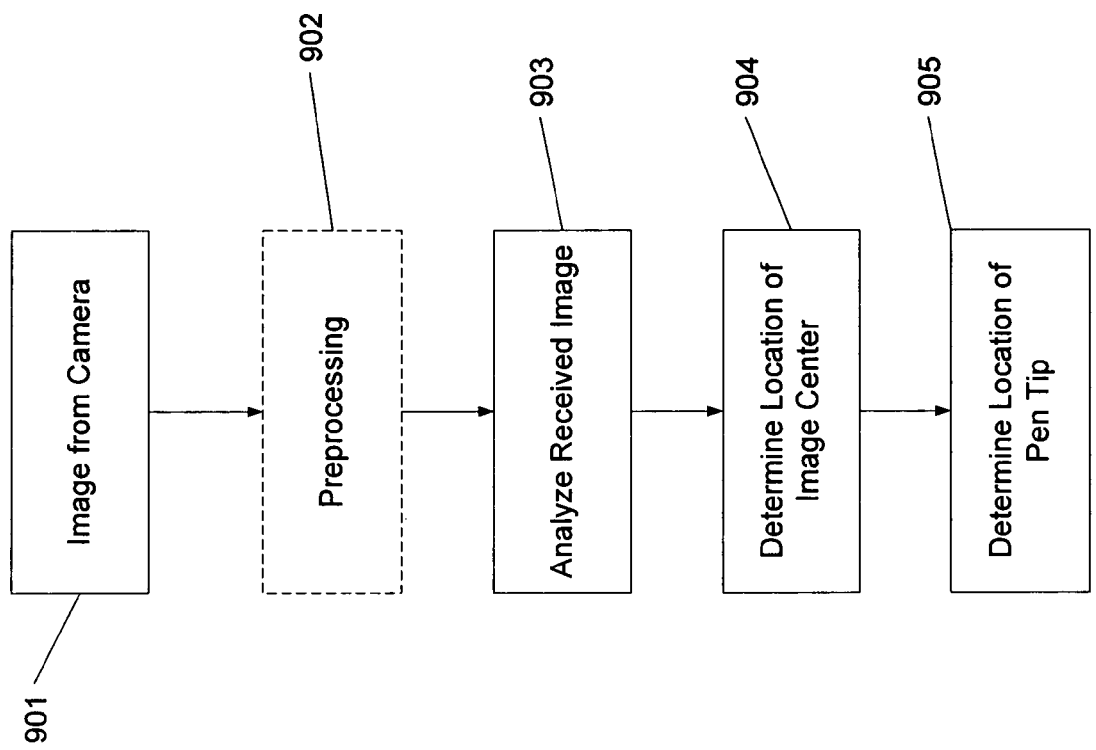
FIG. 9 shows a method for determining the location of a captured image in accordance with embodiments of the present invention.

FIG. 9 shows a process for determining the location of a pen tip. The input is an image captured by a camera and the output may be position coordinates of the pen tip. Also, the output may include (or not) other information such as a rotation angle of the captured image.

In step 901, an image is received from a camera. Next, the received image may be optionally preprocessed in step 902 (as shown by the broken outline of step 902) to adjust the contrast between the light and dark pixels and the like.

Next, in step 903, the image is analyzed to determine the bit stream within it.

Next, in step 904, n bits are randomly selected from the bit stream for multiple times and the location of the received bit stream within the original sequence (or m-sequence) is determined.

Finally, once the location of the captured image is determined in step 904, the location of the pen tip may be determined in step 905.

Figure 10:
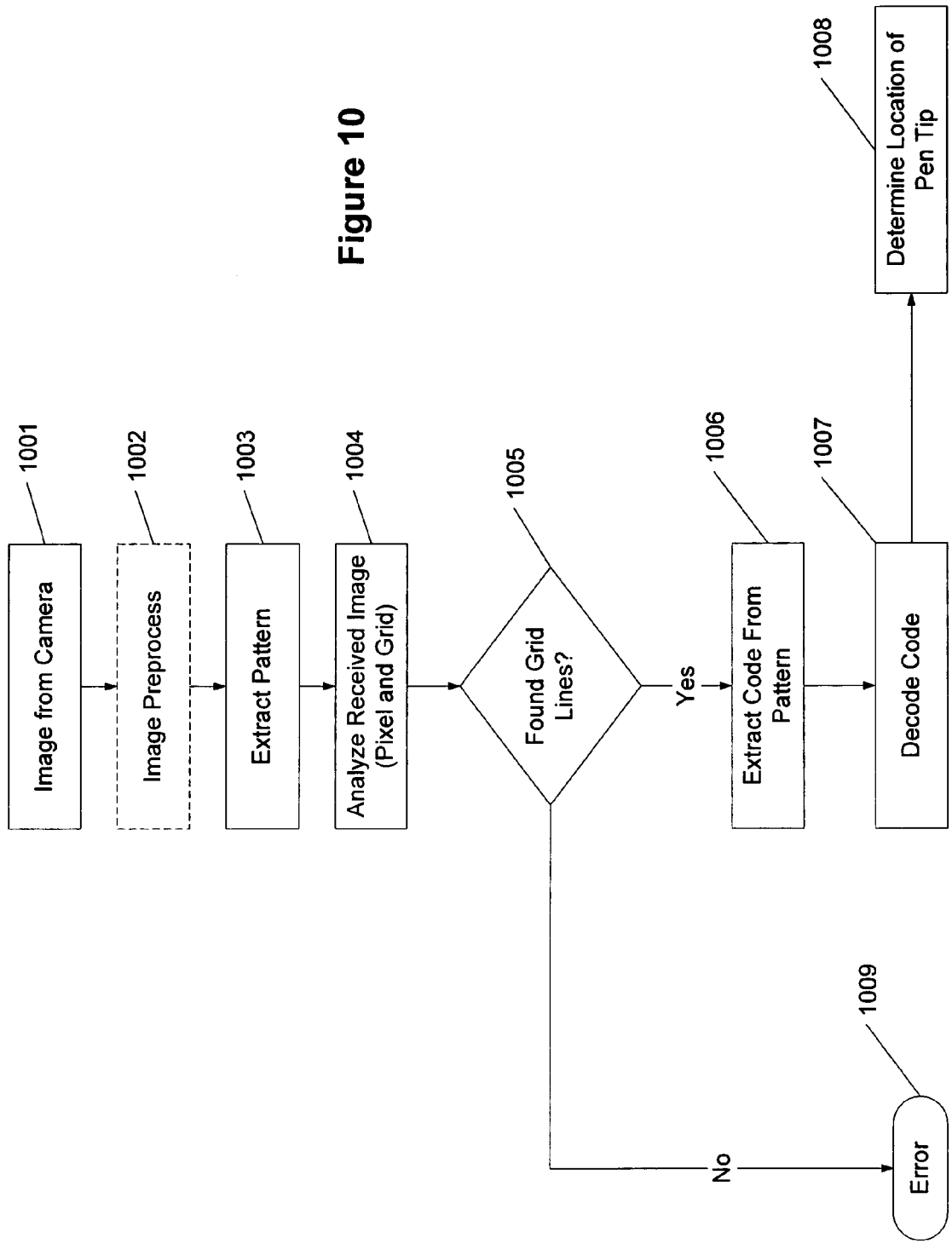
FIG. 10 shows another method for determining the location of captured image in accordance with embodiments of the present invention.

FIG. 10 gives more details about 903 and 904 and shows the approach to extract the bit stream within a captured image. First, an image is received from the camera in step 1001. The image then may optionally undergo image preprocessing in step 1002 (as shown by the broken outline of step 1002). The pattern is extracted in step 1003. Here, pixels on the various lines may be extracted to find the orientation of the pattern and the angle θ.

Next, the received image is analyzed in step 1004 to determine the underlying grid lines.

If grid lines are found in step 1005, then the code is extracted from the pattern in step 1006. The code is then decoded in step 1007 and the location of the pen tip is determined in step 1008. If no grid lines were found in step 1005, then an error is returned in step 1009.

Embedded Interaction Code (EIC) Document

To achieve the synchronization from a paper document to a digital document, it is desirable to establish a mapping between the paper document and the digital document.

An EIC pattern may support embedded metadata as well as (x, y) position information.

The metadata may include associated information, such as the URL of the digital document. However, the quantity of metadata, which can be embedded in the EIC pattern, is relatively limited. As a result, the information, which is bound together with the paper document, is not easy to modify and extend.

To improve flexibility and extensibility, an embodiment of the invention incorporates an EIC document that facilitates the integration between an image capturing pen and applications. An EIC document is a kind of digital file that serves as an intermediate tier between a paper document and a digital document. Both the paper document and the EIC document are typically generated during the printing process. An EIC document meets requirements of both the paper document and the digital document as much as possible, and plays an important role between them. There is typically an intrinsic incompatibility between the paper document and the digital document for the following reasons:

the screen display is often not the same as the printing output a paper document is based on pages, although the corresponding digital document is not necessarily so the digital document is likely to change.

The association between a paper document and a corresponding EIC document is through a DocumentID. An EIC document is uniquely identified by the DocumentID, which may be embedded as metadata into the EIC pattern of the corresponding paper document. In one embodiment of the invention, the metadata capacity is 196 bits. The DocumentID may be a globally unique ID (GUID). In the embodiment, the DocumentID is formed from a serial number component (e.g., an image capturing pen's serial number), a generated random identification component (which may comprise a plurality of random numbers), and a time stamp component (which may comprise a plurality of time stamps). In other embodiments of the invention, the uniqueness of a DocumentID may be guaranteed by an EIC Document Center (as will be discussed below) or by an application itself.

Figure 12:
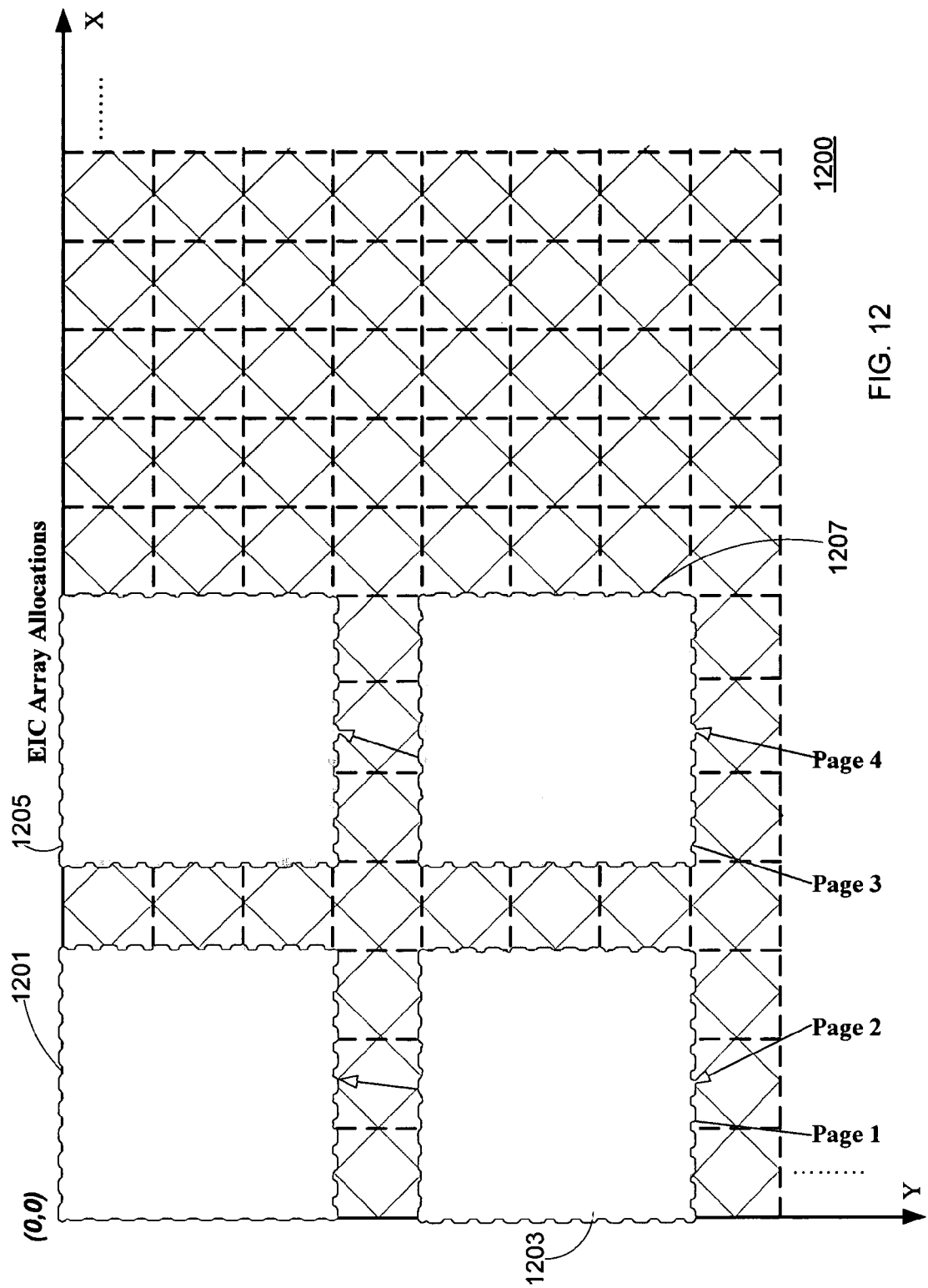
FIG. 12 shows an embedded interaction code (EIC) array allocation according to an embodiment of the invention.

FIG. 12 shows an embedded interaction code (EIC) array allocation 1200 according to an embodiment of the invention. In addition to a DocumentID, EIC Array allocations support an EIC document. A DocumentID may establish the corresponding relationship between a paper document and an EIC document. Another consideration in relating a paper document with an EIC document is how to map a stroke on a page of the paper document back to the page and the location on that page in the EIC document. This facilitates synchronization from the paper document to the digital document. The embodiment of the invention uses EIC Array allocations, as illustrated in FIG. 12. For a specific DocumentID, there is a large 2-D EIC Array that spans the entire document. In the example shown in FIG. 12, portion 1201 corresponds to page 1, portion 1203 corresponds to page 2, portion 1205 corresponds to page 3, and portion 1207 corresponds to page 4. (Please note that FIG. 12 may not depict the actual scaling of the EIC Array allocation.) An EIC array may span a maximum of approximately 1900 pages in A4 size. Each page of the paper document is allocated a different part of the EIC array. The corresponding portion of the EIC Array is printed on the corresponding page.

The EIC document records the EIC Array allocations. When an image capturing pen makes a stroke on a page of paper document, the EIC document may transform the stroke (ink) and inform an application which page the user is writing on and where the ink is on that page.

Figure 13:
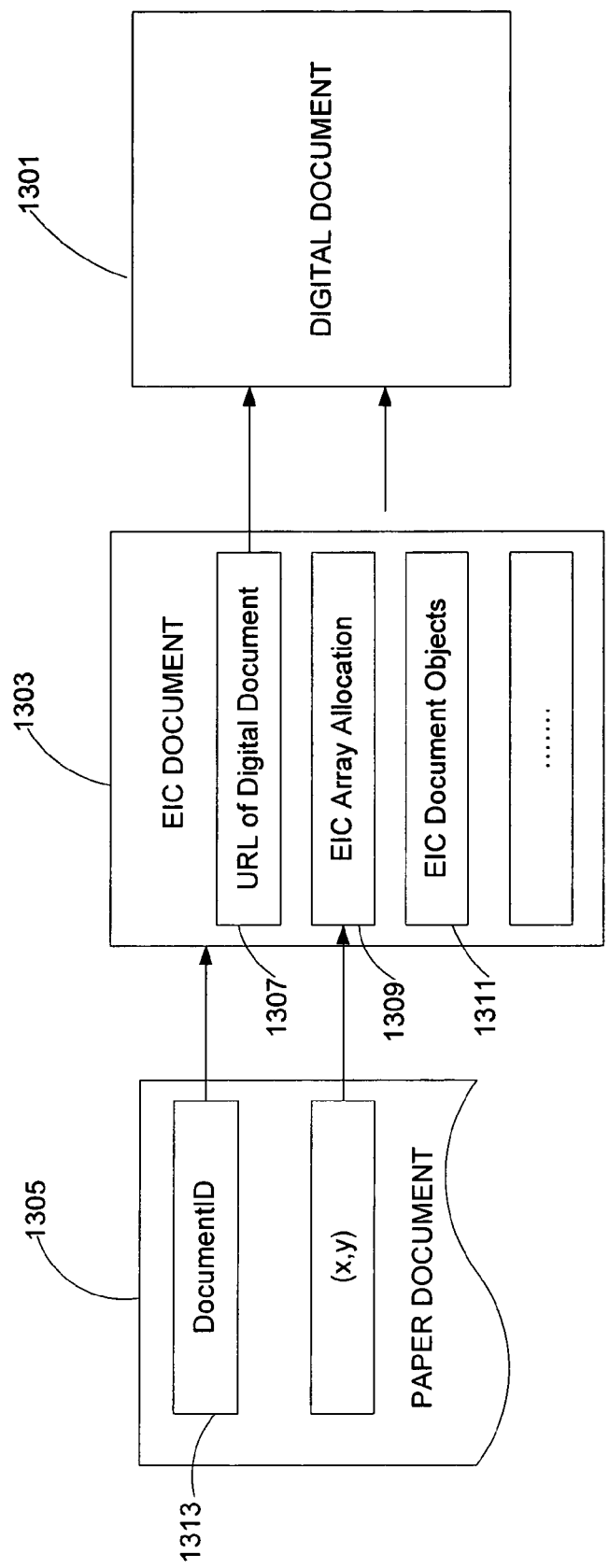
FIG. 13 shows a relationship of a digital document, EIC document, and a paper document according to an embodiment of the invention.

FIG. 13 shows a relationship of a digital document 1301, an EIC document 1303, and a paper document 1305 according to an embodiment of the invention. EIC document 1303 is a snapshot of digital document 1301. EIC document 1303 contains useful information such as URL 1307 of the original digital document, (optionally) the compressed images of pages, EIC array allocation 1309, and so forth. When an image capturing pen makes a stroke on a page of paper document 1305, the embodiment determines which page the user is writing on and where the stroke is on the page within a desired degree of accuracy. Moreover, one needs to recover the stroke into digital document 1301. A stroke in paper document 1305 may not directly translate to digital document 1301.

Although one can decode and then calculate a stroke in paper document 1305, one needs a mechanism to determine where to insert the stroke in digital document 1301 and how to handle the stroke in an application. This issue is resolved by EIC document objects 1311. EIC document objects 1311 are defined and instantiated by an application and are then delegated to EIC document 1303. EIC document object 1311 includes an application-defined data object (which may be of any type), and binding context (which is typically of rectangular region). EIC document object 1311 can install an association between regions on paper document 1305 and objects in digital document 1301. For example, a line/word in a Microsoft® Word document may be associated with an associated printing region in paper document 1305 through EIC document object 1311. When an image capturing pen makes a stroke on the line/word, both the stroke and EIC document object 1311 are sent together as the decoding result to the corresponding application. Referring to EIC document object 1311, the application can process the stroke correctly.

The relationship among paper document 1305, digital document 1301 and EIC document 1303 can be illustrated as below:

DocumentID 1313 embedded in paper document 1305 uniquely identities EIC document 1303.

EIC document 1303 includes URL 1307 pointing to digital document 1301.

Ink position is transformed according to EIC array allocations 1309.

Ink is recovered and synchronized to digital document 1301. EIC document objects 1311 may be used to map from regions in paper document 1305 to objects in digital document 1301.

EIC document 1303 may contain five categories of information: basic information, EIC document image (not shown and as discussed later), EIC command control (not shown and as discussed later), EIC document objects 1311, and strokes objects (not shown and as discussed later).

Basic information includes:

DocumentID: a unique ID identifying the document, and being embedded as metadata in the EIC pattern of the corresponding paper document.

Document Version: the version of the original digital document. The digital document in some environment such as SharePoint Document Library supports the version management. The document version in an EIC document specifies which version of digital document the paper document corresponds to.

Date Modified: the latest date when the original digital document is modified.

Document URL: the location of the original digital document.

Printing setup: paper size, etc.

EIC Array Allocations: the information about which segment of the EIC Array is allocated to each page.

An EIC document image refers to the compressed images of pages of paper document 1305 with one image for every page. This property may be optional or may be mandatory according to an embodiment of the invention.

Figure 14:
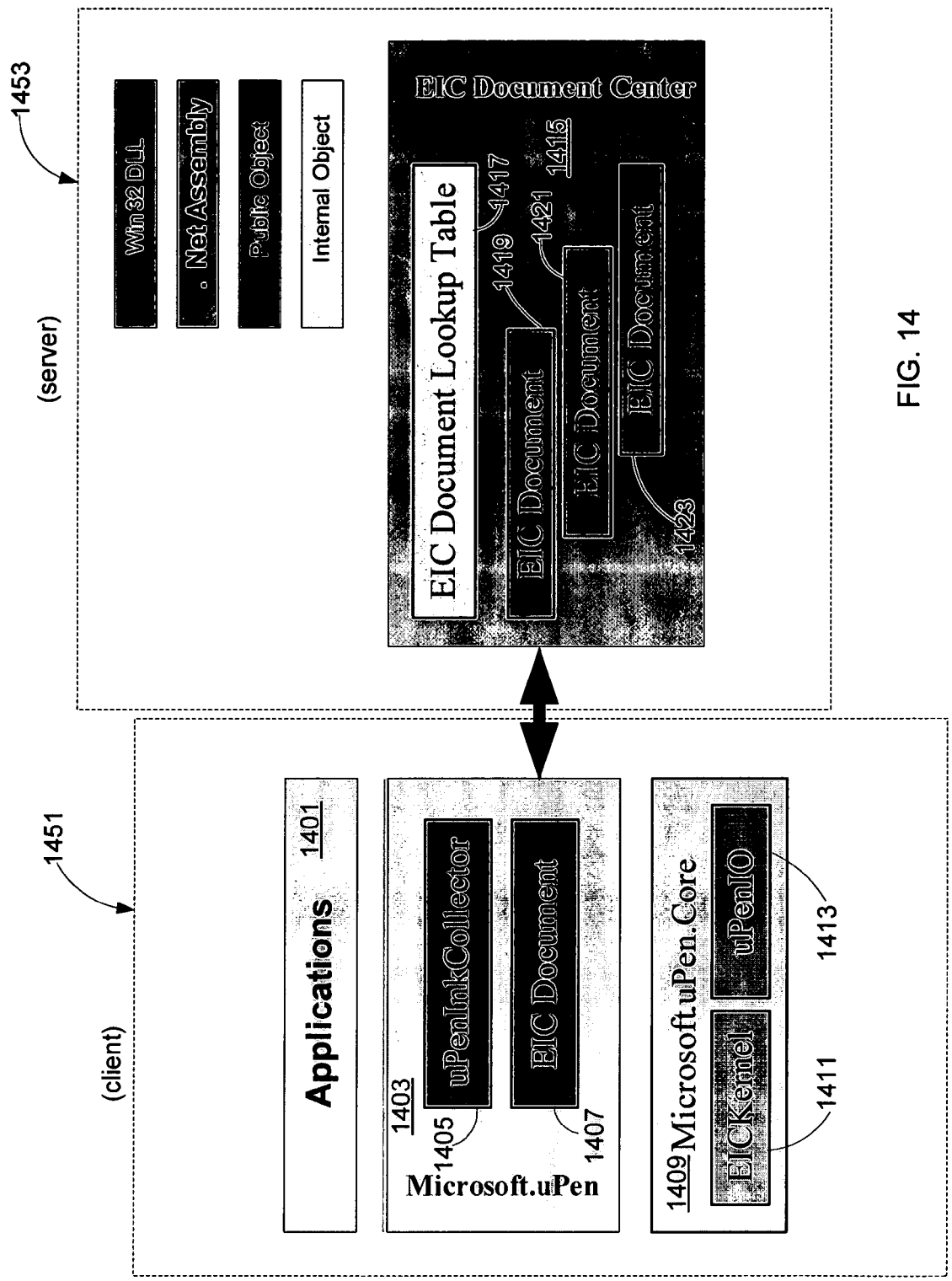
FIG. 14 shows a client-server relationship based on an EIC document center according to an embodiment of the invention.

FIG. 14 shows a client-server relationship based on an EIC document center 1415 according to an embodiment of the invention. An EIC Document (e.g., EIC document 1419, 1421, and 1423) enables high layer uPen module 1403 (in conjunction with low layer uPen module 1409) to synchronize information from paper document 1305 to digital document 1301. With one embodiment of the invention, one accesses an EIC document according to a DocumentID decoded from a paper document and saves the EIC document with the original digital document. (In the embodiment, the EIC document is saved as part of the digital document.) This embodiment may have disadvantages in some user scenarios. For example, applications 1401 are consequently involved with maintenance of the EIC document. Another embodiment of the invention manages substantially all EIC documents in a user's computer, so that applications 1401 can access an EIC document from a central location in the local machine. This embodiment is machine-dependent. With another embodiment of the invention, EIC document center (a central server) 1453 is responsible for maintenance and retrieval of EIC documents 1419, 1421, and 1423. Client 1451 interacts with server 1451 in order to access an EIC document as identified by a DocumentID.

On the client side, uPenInkCollector object 1405 is responsible for receiving uPen strokes from low layer module 1409, receiving EIC Document 1407 from EIC document center 1451, and notifying the decoding result to applications 1401.

On the server side, substantially all EIC documents (1419, 1421, and 1423) are maintained by EIC document center 1415. In the embodiment, lookup table 1417 records relationships from DocumentID to the corresponding EIC document. (Other embodiments of the invention may use other techniques for identifying the relationship.) When client 1451 requests an EIC document, EIC document center 1415 simply looks up the specified DocumentID in lookup table 1417, and subsequently returns the corresponding EIC Document to client 1451.

FIG. 14 shows an architecture of integrating uPen module 1403 with applications 1401. uPen.core module (low layer module) 1409 contains uPen core algorithms that are implemented with EICKernel 1411 and uPenIO 1413. uPen module (high layer module) 1403 resides above module 1409 in the hierarchical stack in order to provide application program interfaces (APIs) for applications 1401. uPenInkCollector object 1405 is responsible for receiving strokes from low layer module 1409, retrieving EIC document 1407 from EIC document center 1415, and notifying final results to applications 1401. When EIC document 1407 is downloaded from EIC document center 1415, EIC document 1407 is typically cached in local machine (client) 1451. As shown in FIG. 14, applications 1401 are freed from the maintenance of EIC documents, so that applications 1401 may focus on synchronizing information from paper documents.

Figure 15:
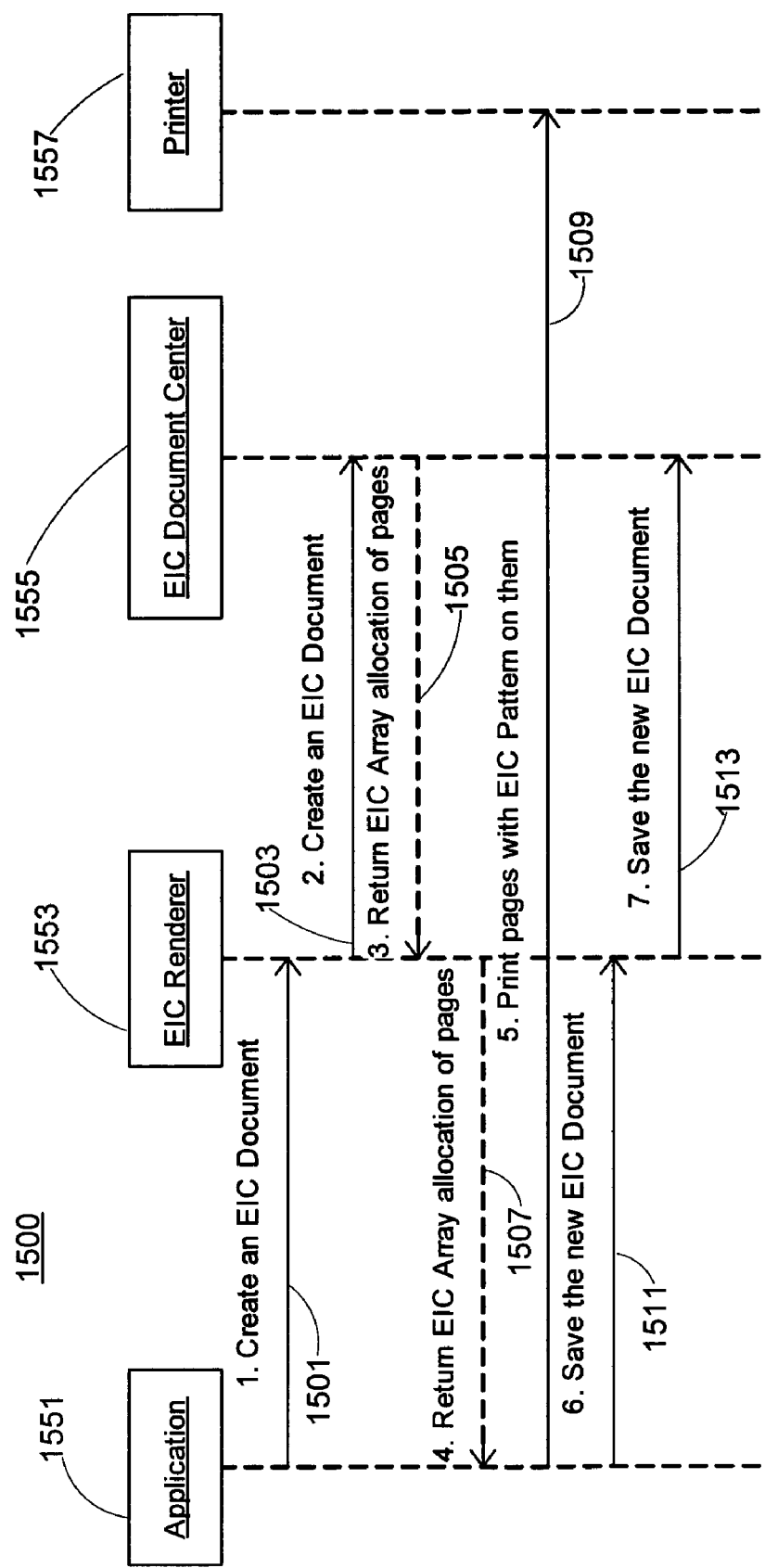
FIG. 15 shows a scenario sequence for EIC document generation according to an embodiment of the invention.

FIG. 15 shows scenario 1500 sequence for EIC document generation according to an embodiment of the invention. In the embodiment, an EIC Document is generated at substantially the same time as a paper document. In other words, both documents are generated during the printing process. The uPen SDK (software development kit) includes EIC renderer object 1553, which is responsible for generating an EIC array, allocating the EIC array to pages, creating the EIC document, and finally saving the resulting EIC document at EIC document center 1555.

In scenario 1500, application 1551 generates request 1501 to EIC renderer 1553 (which is typically implemented at client 1451) to create an EIC document. With request 1501, application 1551 provides EIC renderer 1553 the URL and the version information (if available) of the corresponding digital document. Application 1551 may implement command controls as described later. Also, application 1551 may delegate EIC document objects to the EIC document.

EIC renderer 1553 asks EIC document center 1555 (which is typically implemented at the server) to create the EIC document by sending request 1503 to EIC document center 1555. After the EIC document is generated by EIC document center 1555, EIC array allocations 1505 are returned to EIC renderer 1553. EIC renderer 1553 subsequently forwards the EIC Array allocations to application 1551 with response 1507.

In scenario 1500, application 1551 sends request 1509 to printer 1557 in order to print the document page by page, with a respective corresponding EIC pattern on each page. Subsequently, application 1551 generates request 1511 to EIC renderer 1553 to save the resulting EIC document. (In the embodiment, the document may or may not be printed even though the document is saved.) EIC renderer 1553 then sends request 1513 to EIC document center 1553 in order to save the EIC document.

Figure 16:
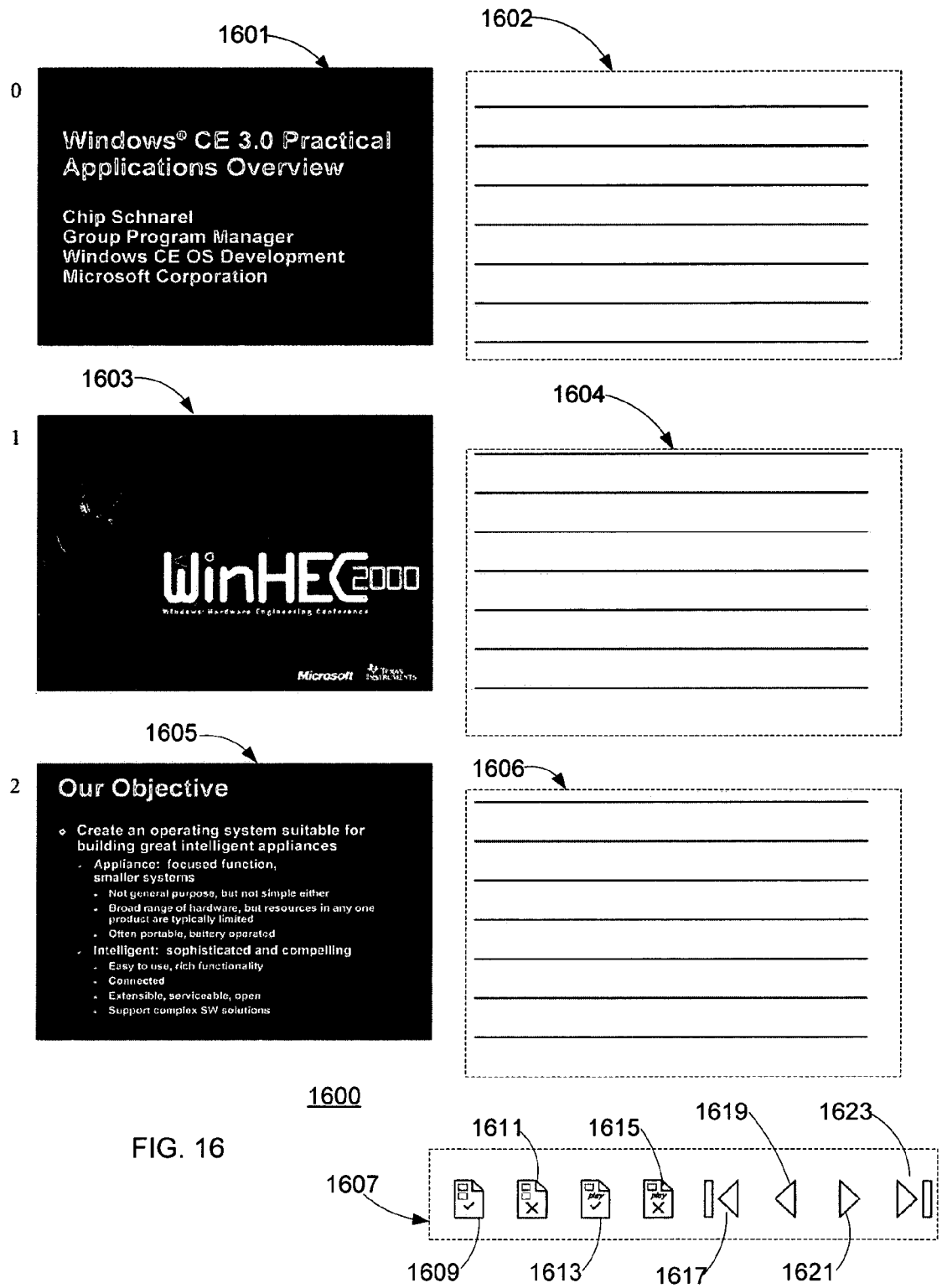
FIG. 16 shows an exemplary embodiment for EIC command control according to an embodiment of the invention.

FIG. 16 shows an exemplary embodiment for EIC command control on printed page 1600 according to an embodiment of the invention. In order to improve the interactive capacity of a uPen system, an embodiment of the invention supports an EIC command control capability (corresponding to interactive command control region 1607). A command control region (e.g., interactive command control region 1607) is typically a rectangular area on the paper document 1305. When a user puts a pen tip in contact with a command control region on the paper document 1305, a command request with a command ID and command specific information is sent to the application. The application may subsequently perform a corresponding application command that is associated with a command control (e.g., command 1617 to go to the first slide in a PowerPoint presentation). The command request contains the following information:

Command ID: the ID identifying the command.

Command Parameters: bound together with the command, which are sent to the corresponding application to process when the command is activated.

Command Control Region: the area of the EIC Command Control.

Command Transformation: the transformation, which is applied on the resulting stroke when the command is activated, and the transform result is sent to the corresponding application to process.

FIG. 16 illustrates an example of the EIC command control capability. The capability supports 14 command controls as follows.

- 3 command controls for slides: if uPen writes on these controls (controls 1601, 1603, and 1605), strokes will be synchronized into the corresponding slide in PowerPoint® through an Addin. The PowerPoint Addin is responsible for receiving and processing command requests from uPen.
- 3 command controls for notes: if uPen writes on these controls (controls 1602, 1604, and 1606), strokes will be recognized and the result will be synchronized into PowerPoint.
- 8 command controls for interactive commands: the command controls represent 8 typical commands in PowerPoint, open a ppt document (command 1609), close a ppt document (command 1611), show slides (command 1613), quit showing (command 1615), go to the first slide (command 1617), go to the previous slide (command 1619), go to the next slide (command 1621), and go to the last slide (command 1623).

FIG. 17 shows an exemplary embodiment of InfoPath™ form 1700 (corresponding to a printed document) according to an embodiment of the invention. An EIC document object refers to objects defined by applications and delegated to the EIC document. In the embodiment, the EIC document object contains the following information:

EIC object ID: a unique ID identifying the object.

Data: the data information of the object. It is of any type, e.g., text and/or graphic Binding Context: specifies to which part the object is associated. The binding context includes:

Global: which means that the object is bound with the entire EIC Document; or

Page: which means that the object is bound to a specified page; or

Region: the object is bound to a specified region in the EIC Document.

From the structure of an EIC document object, one observes that the EIC document provides a mechanism to associate a part of a paper document with an application-defined object in the corresponding digital document. Consequently, an uPen operation may be associated with one or more application-defined objects in the corresponding digital document. As a result, even though the digital document looks different from the paper document or may change, an uPen operation is interpreted and synchronized to the digital document if corresponding EIC document objects exist.

A typical application of EIC document object is Info-Path®. InfoPath should be informed of which form field (e.g., fields 1701-1723) that the new ink (stroke) belongs to. Info-Path should also recognize the ink according to the type of the field and then fill the recognized results into the field automatically. (For example, a converted character string may be inserted in field 1701 while the strokes that correspond to a signature remain in field 1723 to preserve the original signature.) While the ink positions may not be related to the screen view of the digital document, the ink positions are related to the printing view of the paper document. Moreover, the screen display may continually change during form filling. The application should be informed of the positions of the field on the printed paper. The application may then correctly determine which field should be filled by the new ink. If an EIC document object is used, an association process can be handled as follows: calculating the printing position of fields, wrapping relevant information such as the position and type of field into an EIC document object, and delegating the EIC document objects to the EIC document during the printing process. Subsequently, InfoPath may retrieve the EIC document objects for recognizing and filling.

Figure 18:
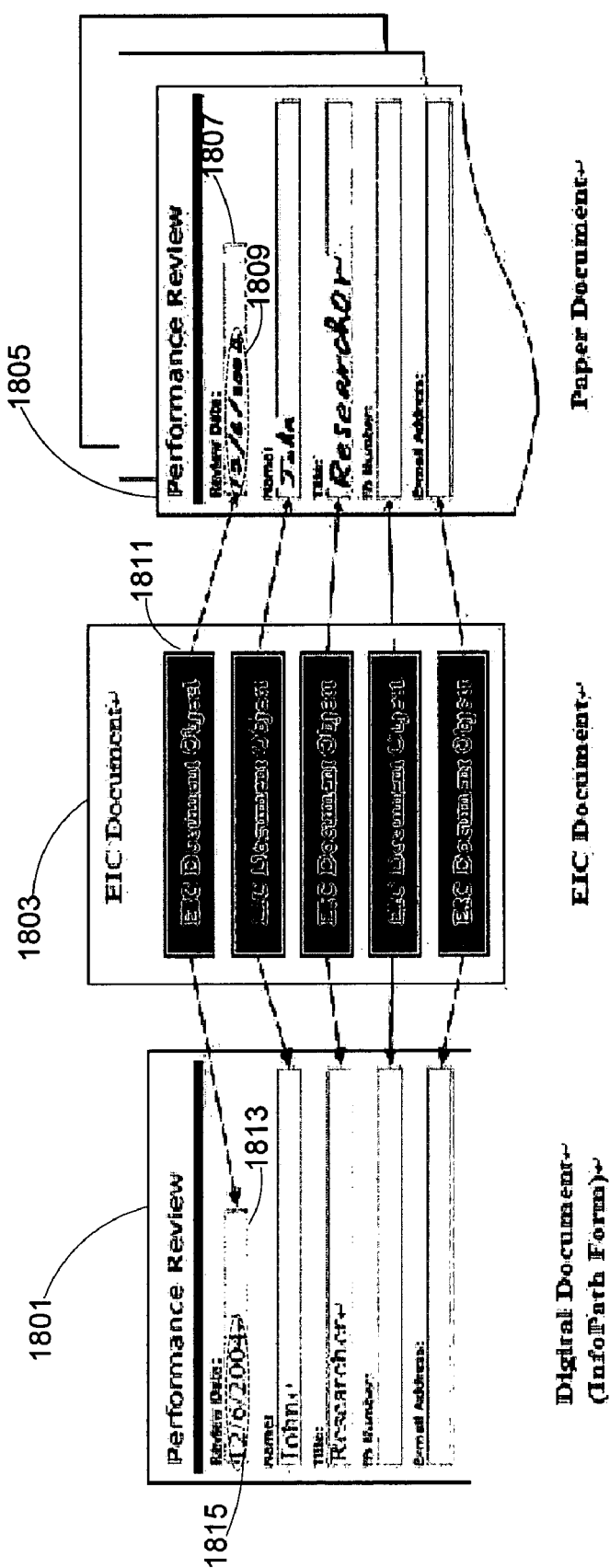
FIG. 18 illustrates a relationship between EIC document objects and strokes according to an embodiment of the invention.

FIG. 18 illustrates a relationship between EIC document objects and associated strokes according to an embodiment of the invention. Every field of interest (e.g., field 1807 of paper document 1805) has a corresponding EIC document object (e.g., EIC document object 1811 in EIC document 1803), which describes the position, type and some other application-specific information.

In the embodiment, every EIC document object contains corresponding information, including the position (x,y) of the field on paper and the XPath of the field in InfoPath form 1801. (The primary purpose of XPath is to address parts of an Extensible Markup Language (XML) document.) When a stroke (ink) is written, InfoPath receives the stroke information. The stroke (e.g., stroke 1809) corresponds to a stroke object. The strokes object stores stroke data. The stroke object may include a Pen ID, which is a unique ID identifying the pen that writes the stroke, and binding information for binding the stroke object to one or more EIC document objects.

InfoPath then iterates over substantially all EIC document objects in the EIC document and finds the EIC document object that is nearest to the stroke (according to position information of fields on paper). By this means, InfoPath can figure out which EIC document object each stroke belongs to. The embodiment may associate different strokes with each other if the different strokes are associated with the same document entity, e.g., a user's signature. Each stroke may be associated with multiple stroke objects, which are mapped to the same or different EIC document objects. A stroke object is typically mapped to an EIC document object, although a stroke object may be mapped to a plurality of EIC document objects.

When a user requests InfoPath to convert strokes into character strings and to put the character strings (e.g., character string 1815) into fields (e.g., field 1813) of the InfoPath form 1801, InfoPath performs the conversion by the following:

For each EIC document object, InfoPath knows the strokes that belong to the EIC document object. InfoPath recognizes the strokes into text.

InfoPath gets the field in InfoPath form according to the XPath information, and puts the text into the field.

In the examples shown in FIGS. 16 and 17, a printed EIC pattern is embedded.

However, the printed EIC pattern is typically inconspicuous to reduce visibility to a user while providing (x,y) information to uPen low layer module 1409 as shown in FIG. 14.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

We claim:

1. A computer-readable medium having computer-executable instructions that when executed by a processor performs a method, the method comprising:

generating a sequence of numbers, wherein each segment of the sequence of predetermined length occurs in the sequence only once;

constructing a two-dimensional array by folding the generated sequence of numbers;

obtaining an EIC pattern by converting each number of the two-dimensional array into a graphical element;

receiving a first request for creating an embedded interaction code (EIC) document, the first request containing a document address of a corresponding digital document;

obtaining the corresponding digital document;

obtaining a unique identifier for the corresponding digital document;

embedding as metadata within the EIC pattern the unique identifier for the corresponding digital document;

creating the EIC document, including:

embedding within the EIC document a URL associated with the corresponding digital document;

allocating, within the EIC document, an EIC array allocation, the EIC array allocation containing a mapping of document pages to a portion of the EIC pattern, the document pages corresponding to printed pages of a corresponding paper document; and returning the EIC document with the EIC array allocation as a response to the first request, wherein the EIC document is stored separately from the corresponding digital document, wherein when the digital document is printed, each page of the printed document includes the portion of the EIC pattern mapped to the page by the EIC array allocation of the EIC document, and wherein the EIC array allocation of the EIC document is used to determine the page from which an image of the printed document is captured, the image containing a portion of the EIC pattern, without decoding page information directly from the portion of the EIC pattern.

2. The computer-readable medium of claim 1, further comprising:

receiving a second request to save the EIC document; and saving the EIC document.

3. The computer-readable medium of claim 1, further comprising:

receiving a third request to retrieve the EIC document, the third request containing the document identification;

using the document identification to retrieve the EIC document; and returning the EIC document.

4. The computer-readable medium of claim 1, further comprising:

embedding the document identification in the EIC document.

5. A computer-readable storage medium containing computer-executable instructions that when executed by a computer having a memory and a processor cause the computer to perform a method comprising:

generating a first request to create an embedded interaction code (EIC) document, the first request containing a document address of a corresponding digital document;

receiving the EIC document, the EIC document containing:

an embedded document identification as metadata in an EIC pattern, wherein the EIC pattern is generated at least in part by:

generating a sequence of numbers, wherein each segment of the sequence of predetermined length occurs in the sequence only once, constructing a two-dimensional array by folding the generated sequence of numbers, and converting each number of the two-dimensional array into a graphical element, and an EIC array allocation, the EIC array allocation containing a mapping of each page of a corresponding paper document to a portion of the EIC pattern, the corresponding paper document corresponding to a printed version of the corresponding digital document;

storing the EIC document separately from the corresponding digital document; capturing an image of a page of the printed version of the corresponding digital document;

identifying a portion of the EIC pattern contained within the captured image; and using the EIC array allocation of the received EIC document to identify the page of the corresponding digital document from which the captured image was captured, wherein when the corresponding digital document is printed, each page of the printed document includes the portion of the EIC pattern mapped to the page by the EIC array allocation of the EIC document, and wherein the EIC array allocation of the EIC document is used to determine the page from which an image of the printed document is captured, the image containing a portion of the EIC pattern, without decoding page information directly from the portion of the EIC pattern.

6. The computer-readable medium of claim 5, further comprising:

generating a second request to print the corresponding paper document, the corresponding paper document containing the EIC pattern with a pagination corresponding to the EIC array allocation.

7. The computer-readable medium of claim 5, further comprising:

updating the EIC document with at least one stroke object, each stroke object being associated with an EIC document object.

8. The computer-readable medium of claim 7, further comprising:

generating a second request to save the EIC document.

9. The computer-readable medium of claim 5, further comprising:

defining at least one EIC document object, each of the at least one EIC document object being associated with a corresponding region of the corresponding paper document and a digital document object of the corresponding digital document; and delegating the at least one EIC document object to the EIC document.

10. The computer-readable medium of claim 9, further comprising:

determining a position of at least one field on the corresponding paper document; and mapping the at least one field to the at least one EIC document objects.

11. The computer-readable medium of claim 10, further comprising:

creating a stroke object from a stroke, the stroke object containing stroke data for the stroke.

12. The computer-readable medium of claim 11, further comprising:

binding the stroke object to one of the at least one EIC document objects.

13. The computer-readable medium of claim 12, further comprising:

creating another stroke object for another stroke and binding the other stroke object to said one of the at least one EIC document object.

14. The computer-readable medium of claim 5, wherein a paper document is associated with the corresponding digital document, the method further comprising:

mapping a region of the corresponding paper document to an EIC command control object, the EIC command control object being associated with a corresponding application command.

15. The computer-readable medium of claim 14, further comprising:

processing the corresponding application command in response to an image capturing pen tip touching the region of the corresponding paper document.

16. The computer-readable medium of claim 15, wherein the command information is selected from the group consisting of a command identification, a command parameter, a command control region, and a command transformation.

17. An apparatus having a processor and a memory that processes an electronic document, comprising:

an embedded interaction code (EIC) renderer module that obtains an EIC document corresponding to the electronic document, wherein the EIC document and the corresponding electronic document are stored separately, wherein the EIC document includes an EIC array allocation, the EIC array allocation mapping portions of an EIC pattern to pages of a paper document associated with the electronic document, and that embeds an embedded document identification as metadata into an associated EIC pattern, wherein the associated EIC pattern is generated at least in part by:

generating a sequence of numbers, wherein each segment of the sequence of predetermined length occurs in the sequence only one, constructing a two-dimensional array by folding the generated sequence of numbers, and converting each number of the two-dimensional array into a graphical element, wherein when the electronic document is printed, each page of the printed document includes the portion of the EIC pattern mapped to the page by the EIC array allocation of the EIC document, and wherein the EIC array allocation of the EIC document is used to determine the page from which an image of the printed document is captured, the image containing a portion of the EIC pattern, without decoding page information directly from the portion of the EIC pattern;

a low layer module that receives stroke information from an image capturing pen, wherein a stroke is generated in relation to the paper document;

a high layer module that obtains the stroke information from the low layer module and that maps the stroke to an associated EIC document object; and an application module that interfaces with the high layer module and that synchronizes the stroke to a portion of the paper document using the EIC array allocation by determining from which page the stroke from the image capturing pen was captured at least in part by comparing the received stroke information with the EIC array allocation of the EIC document wherein the modules comprise computer-executable instructions stored in memory for execution by the processor.

18. The apparatus of claim 17, wherein the application module further instructs a printer to print the paper document that includes the associated EIC pattern.

19. The apparatus of claim 17, further comprising:

an apparatus module that maps a region of the paper document with an EIC command control object, wherein the EIC command control object is associated with a corresponding application command.

* * * * *

UNITED STATES PATENT AND TRADEMARK OFFICE
CERTIFICATE OF CORRECTION

PATENT NO. : 7,607,076 B2 Page 1 of 1
APPLICATION NO. : 11/062166
DATED : October 20, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 764 days.

Signed and Sealed this

Fourteenth Day of December, 2010

David J. Kappos
*Director of the United States Patent and Trademark Office*